(12) United States Patent
Wagner et al.

(10) Patent No.: US 10,510,037 B1
(45) Date of Patent: *Dec. 17, 2019

(54) MEASURING DEVICE AND SYSTEM FOR FREIGHT RATE OPTIMIZATION

(71) Applicant: FIDA, LLC, Pittsburgh, PA (US)

(72) Inventors: Michael Wagner, South Park, PA (US); David Scherer, Greensburg, PA (US)

(73) Assignee: FIDA, LLC, Pittsburgh, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/664,021

(22) Filed: Jul. 31, 2017

Related U.S. Application Data

(63) Continuation of application No. 15/248,677, filed on Aug. 26, 2016, now Pat. No. 9,747,578.

(60) Provisional application No. 62/210,903, filed on Aug. 27, 2015.

(51) Int. Cl.
  *G06Q 10/08* (2012.01)

(52) U.S. Cl.
  CPC ... *G06Q 10/08345* (2013.01); *G06Q 10/0838* (2013.01)

(58) Field of Classification Search
  CPC .............................................. G06Q 10/08345
  See application file for complete search history.

(56) References Cited

U.S. PATENT DOCUMENTS

| 5,946,662 | A  | 8/1999  | Ettl et al.     |
| 6,611,787 | B2 | 8/2003  | Stringer et al. |
| 7,761,337 | B2 | 7/2010  | Caballero et al.|
| 7,783,534 | B2 | 8/2010  | Armstrong et al.|
| 8,285,731 | B2 | 10/2012 | Peeters et al.  |
| 8,370,182 | B2 | 2/2013  | Gupta et al.    |

(Continued)

FOREIGN PATENT DOCUMENTS

| JP |       4014559       | 11/2007 |
| WO | WO 2014/139464 A1   | 9/2014  |
| WO | WO 2014/203025 A1   | 12/2014 |

OTHER PUBLICATIONS

Williams, Zachary, Garret, Michael S., and Taylor, G. Stephen, "Carrier Selection: Understanding the Needs of Less-Than-Truckload Shippers," Transportation Journal, 52.2, 151(32), American Society of Transportation and Logistics, Inc. (Apr. 2013-Jun. 2013).*

(Continued)

*Primary Examiner* — Nathan Erb

(57) ABSTRACT

A computer-based system that manages the shipment of one or more freight units includes a measuring system for measuring dimensions and weight of a freight unit, wherein the freight unit includes products, a database for storing rules for shipping freight, and a host computer system. The host computer system is for receiving information about the freight unit to be shipped, determining whether the products of the freight unit should be classified as density-based for a shipping rate determination, determining a density-based class of the freight unit, determining whether the linear feet parameter for the freight unit exceeds a predetermined threshold value, receiving a selection input for a selected carrier from the one or more carriers displayed on the web site, and upon receipt of the selection input for the selected carrier, creating a bill of lading.

21 Claims, 19 Drawing Sheets

(56) References Cited

U.S. PATENT DOCUMENTS

| | | |
|---|---|---|
| 8,571,915 B1 | 10/2013 | Wong et al. |
| 9,213,953 B1 | 12/2015 | Kassmann et al. |
| 9,747,578 B2 * | 8/2017 | Wagner ............ G06Q 10/08345 |
| 2005/0071247 A1 | 3/2005 | Kelley et al. |
| 2007/0038673 A1 | 2/2007 | Broussard et al. |
| 2011/0218926 A1 | 9/2011 | Addala et al. |
| 2013/0179362 A1 * | 7/2013 | Rhyan .............. G06Q 10/08345 |
| | | 705/335 |
| 2014/0031965 A1 | 1/2014 | Sun et al. |
| 2014/0214492 A1 | 7/2014 | Bergerson et al. |

OTHER PUBLICATIONS

Wililams et al., "Carrier Selection: Understanding the Needs of the Less-Than-Truckload Shippers", Transportation Journal, 52.2, 151(32), American Society of Transportation and Logistics, Inc.; Apr. 2013-Jun. 2013, 32 pages.

* cited by examiner

MEASURING DEVICE AND SYSTEM FOR FREIGHT RATE OPTIMIZATION

PRIORITY CLAIM

The present applications is a continuation of U.S. patent application Ser. No. 15/248,677, filed Aug. 26, 2016, now U.S. Pat. No. 9,747,578, which claims priority to U.S. provisional patent application Ser. No. 62/210,903 filed on Aug. 27, 2015, both of which are incorporated herein in their entirety.

BACKGROUND

As the freight industry becomes more and more competitive with freight carriers running on paper thin margins, it is increasingly the case that obscure rules and fees are being created in an effort for carriers to maintain a competitive price structure while remaining profitable. Previously a shipper of freight would need to be intimately familiar with the many rules for each individual carrier including the various methods of determining shipment characteristics such as density, linear footage, volume, and when each method were to be used, and whether any of those characteristics would cause the carrier to reject the freight or charge an exorbitant fee to move it or if additional charges simply applied. Without this system it is impractical—bordering on impossible—to choose the absolute cheapest carrier for a specific shipment in a specific lane and not be impacted by unknown surcharges and fees by the carrier after they've moved a shipment.

Traditionally, a shipper will single-source their freight to a major national carrier or to regional carriers based on the shipment destination. Some shippers use generic rating systems that provide pricing for multiple carriers based only on the total weight and class of the shipment without accounting for the shipment density or dimensions or other rules that are less common or very obscure but cause a shipper to incur expensive surcharges. Still other shippers rate a shipment on each carrier's website or using a small piece of software provided by each carrier which contains the pricing and discounts negotiated with the carrier. These systems lack any kind of sophisticated decision-making logic beyond the standard process of using the weight and class of a shipment to determine a rate based on the origin and destination and the base charge, minus any discount negotiated, plus the cost of a fuel surcharge and any special service charges such as residential delivery or a lift gate.

SUMMARY

In one general aspect, the present invention is directed to computer-based systems and methods that optimize freight rates for shipping a freight unit, typically for ground transportation by truck. The system can optimize the freight rate by automatically determining the applicable density or non-density based shipping class for the freight unit based on measured parameter values of the freight unit, and applying carrier-specific shipping rules for a number of different carriers to determine the best (e.g., lowest) shipping rate for the freight unit among the carriers, while considering the many complex and different shipping rules of the carriers.

In that connection, a system for managing a shipment of one or more freight units can comprise a measuring system for measuring dimensions and weight of a freight unit that comprises one or more products. The system also comprises a host computer system that comprises a web server and a database for storing, for each of a plurality of shipping carriers, rules for shipping freight. The host computer system is for receiving information about the freight unit to be shipped, where the information comprises: (i) dimensions of the freight unit as determined by the measuring system; (ii) a weight of the one or more products of the freight unit as determined by the measuring system; and (iii) an origination location and a destination location for shipping the freight unit. The information is received from a user via a first web page on a web site provided by the web server.

The host computer system is programmed to determine, based on the received information and information about product types for the products of the shipment, whether the one or more products of the freight unit should be classified as density-based for shipping rate determination. Upon a determination that the freight unit is classified as density-based, the host computer system determines the density-based class of the freight unit, determines a linear feet parameter for the shipment based on positional configurations of the one or more freight units, and determines whether the linear feet parameter, or other dimension, for the freight unit exceeds a predetermined threshold value. Based on the carrier-specific shipping rules stored in the database, the host computer system then determines one or more carriers that will ship the freight unit based on the density-based class and/or the linear feet parameter and determines a shipping rate for the freight unit for each of the one or more carriers that will ship the freight unit. In one embodiment, the shipment being shipped is for a shipper that is associated with a preselected list of carriers, under which circumstances, the host computer system determines the one or more carriers from the preselected list of carriers for the shipper. The host computer system may also determining the one or more carriers that will ship the shipment by determining, for at least one of the one or more carriers, a predetermined threshold value of a shipping dimension for a freight unit and determining whether at least one of the one or more freight units of the shipment exceeds the predetermined threshold value of the shipping dimension. Furthermore, whether at least one of the one or more freight units of the shipment exceeds the predetermined threshold value of the shipping dimension may affect a shipping rate calculation for the one or more carriers.

The host server can also serve a web page to the user that displays a ranking of the one or more carriers. The ranking of the one or more carriers may be based on the shipping rate for the freight unit. The host computer system can then receive a selection input for a selected carrier from the one or more carriers displayed on the first web site from the user and, upon receipt of the selection input for the selected carrier, create an electronic bill of lading file for the shipment.

By aggregating these rules for all carriers and incorporating data from analysis done on past shipments and a shipper's organizational priorities, the shipper can then make a just-in-time decision about whether to increase the cost of shipping with a specific carrier on a specific lane or to exclude the carrier's pricing altogether. These and other potential benefits of the present invention will be apparent from the description that follows.

FIGURES

Various embodiments of the present invention are described herein by way of example in connection with the following figures, wherein:

FIGS. 5-19 are screenshots from webpages according to embodiments of the present disclosure.

DESCRIPTION

Figure 1:
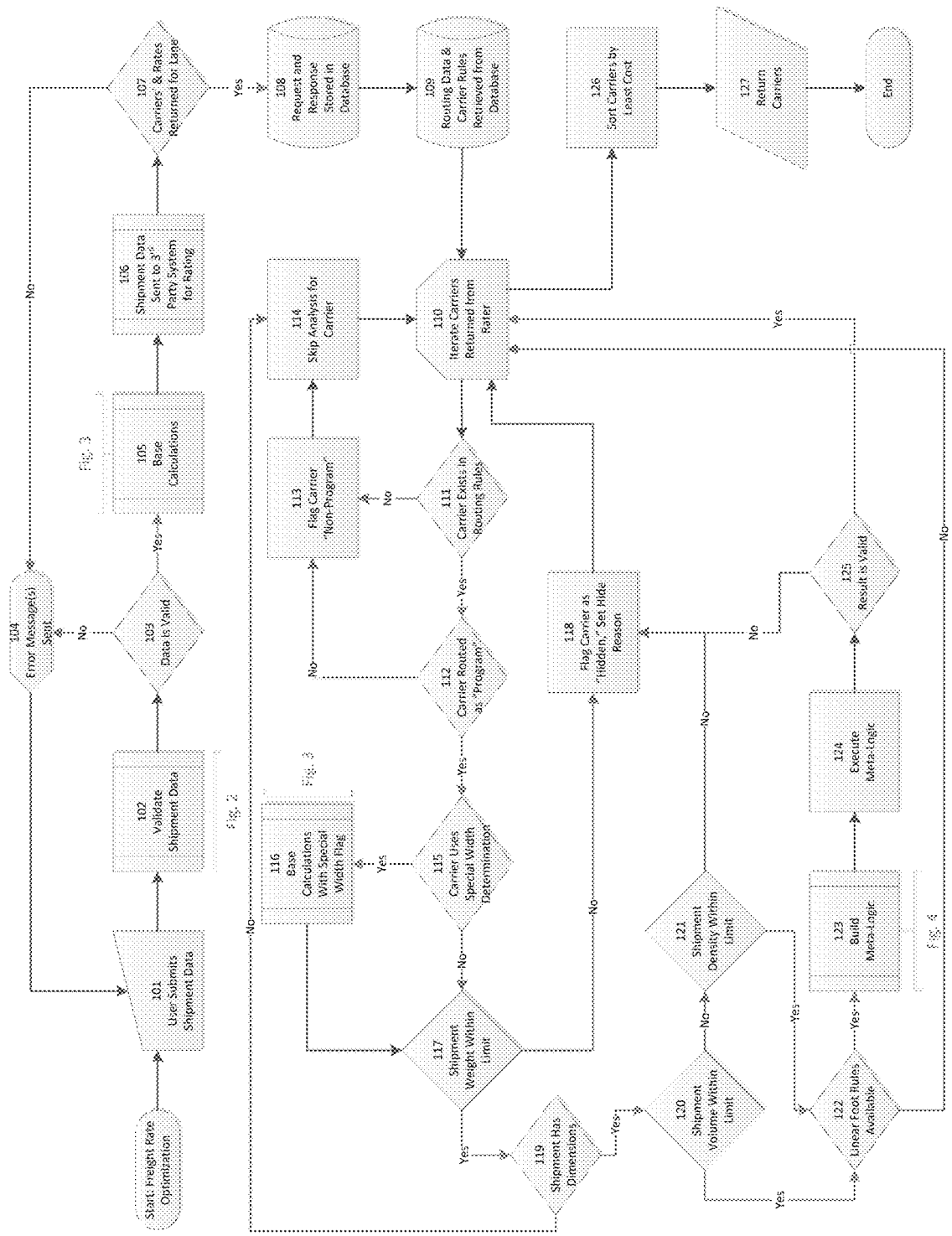
FIG. 1 is a flowchart showing the method of operation of one embodiment of the present invention.
Figure 1A:
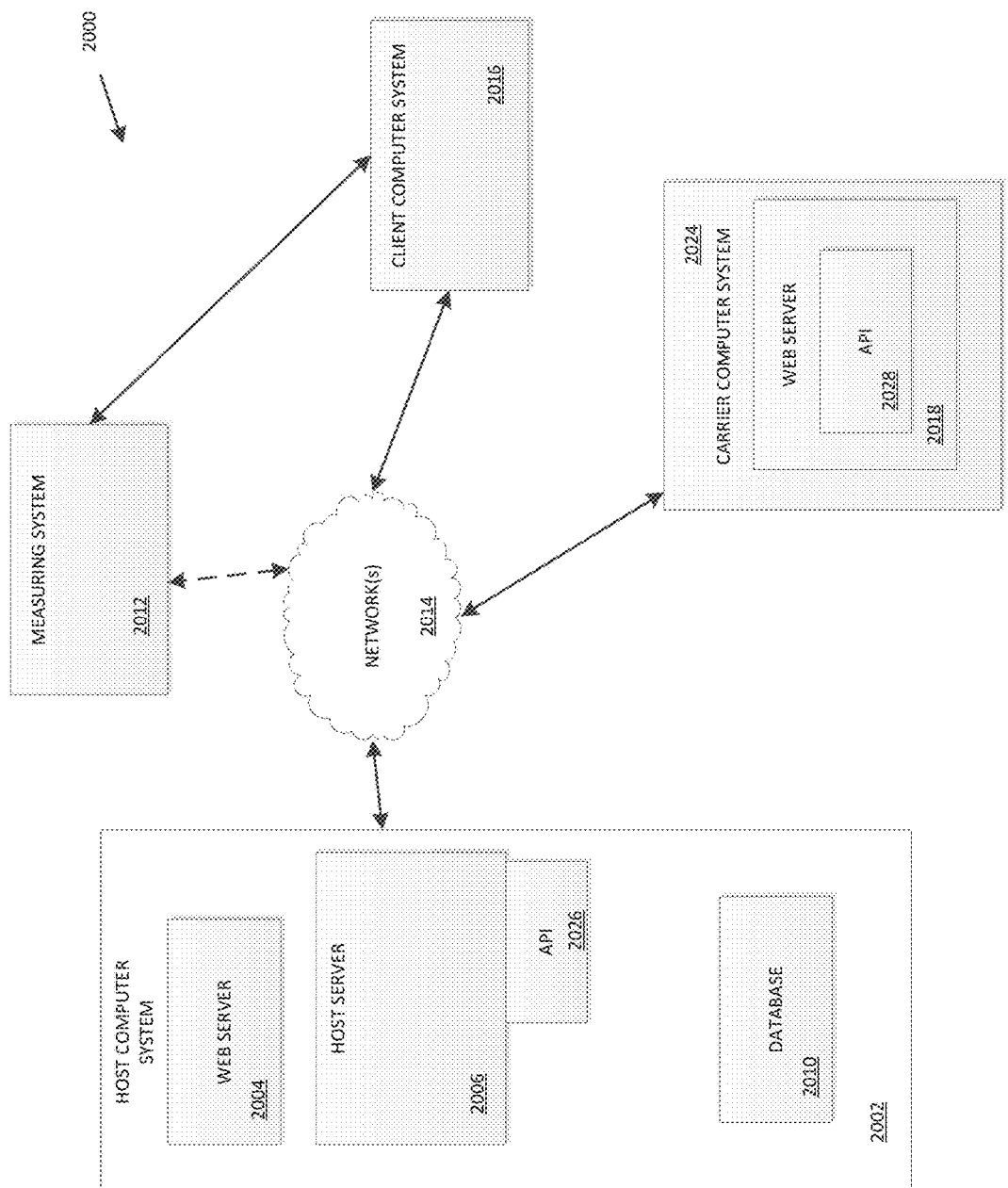
FIG. 1A is a diagram of a network architecture for operation of one embodiment of the present invention.

FIG. 1A is a diagram of a computer-based freight management system for managing freight rate optimization for a client or customer (a "shipper") that seeks to ship freight by a carrier. In the description to follow, the carriers are assumed to be ground shipping companies, i.e., trucking companies, but the present invention can also be applicable to other types of freight carriers, such as rail, air, and water transport. As shown in FIG. 1A, the system 2000 comprises a host computer system 2002, a number of client computer systems 2016 (only one of which is shown in FIG. 1A for simplicity) and a number of carrier computer systems 2024 (only one of which is shown in FIG. 1A for simplicity). As explained in more detail below, a client that seeks to have freight shipped by a carrier accesses, from their associated client computer system 2016, a web page hosted by a web server 2004 of the host computer system 2002 in order to input, via the web-based interface provided by the web page, details about the freight unit (e.g., a loaded pallet) to be shipped. In particular, the web page allows a client to input automatically and/or manually parameters about the freight unit, such as the dimensions and weight of the freight unit, as well as the origination and destination of the shipment and the time frame for shipping it. Examples of these web pages are provided below. The host computer system 2002 can then compute applicable shipping rates based on the shipping rules of various carriers.

Many carrier shipping rules relate to the parameters of a freight unit when it comes to determining the cost to ship the products that make up the freight unit. To that end, the density of the shipment and the type or class of goods being shipped may be parameters provided to the host computer system 2002 that allow for determining a shipping rate. As such, and as described in more detail below, the host computer system 2002 can determine the applicable density or shipping class of a freight unit and, based on the rules, determine the applicable shipping costs for one or more carriers. Furthermore, the measuring system 2012, which is described further below, may be used for measuring dimensions and weight of a freight unit. As shown in FIG. 1A, the host computer system 2002 comprises a database 2010 for storing, for each of a plurality of shipping carriers, rules for shipping freight. The carrier-specific rules of each of the shipping carriers may be dependent on the parameters of the freight unit and the rules in the database may be updated on a predetermined time frame or they may be updated on an ad hoc basis by a respective shipping carrier.

Based on inputs provided by a user via the client computer systems 2016 at a web site provided by the web server 2004, the host computer system 2002 receives information about a freight unit to be shipped, such as the dimensions and weight of the freight unit as determined by the measuring system. The dimensions of the freight unit that are input may comprise a length, a width, and/or a height of the freight unit. The input parameters may also comprise an overall weight of the freight unit as determined by the measuring system, an origination location and a destination location for shipping the freight unit, a time frame for shipping the unit, and product information about the one or more products of the freight unit. The product information may include the conventional non-density-based shipping class for the products or other descriptive, relevant information about the products so that the conventional non-density-based shipping class or density-based shipping class can be determined. Further, the information about the freight unit may comprise an indication of whether the freight unit is stackable. In one embodiment, when the indication is such that the freight unit is not, stackable, the host computer server 2006 may assign a default height value for the freight unit that is related to the standard height of the carrier's shipping compartment or container, for example, the box of a truck which may be, for example, 96 inches. Accordingly, by assigning a default height value for the freight unit, a shipping rate for the freight unit may be calculated differently than if the actual height unit were used in the calculation.

In various embodiments, the host server 2006 determines whether the freight unit is classified as density-based for purposes of determining the shipping costs by the carriers. If the freight unit is density-based, the host server 2006 uses the parameter values for the freight unit, whether received from the measuring system 2012 or input by the client at the client computer system 2016 via the web pages, which are described below, provided by web server 2004 to determine a density-based class of the freight unit. According to various embodiments of the present invention, the density class may correspond to a freight class defined by the National Motor Freight Traffic Association (NMFTA) and made available through the NMFC or National Motor Freight Classification. The freight class may be based on weight, length and height, density, ease of handling, value and liability from things like theft, damage, break-ability and spoilage. In addition, a type of product may be assigned a National Motor Freight Classification (NMFC) and corresponding class for less than truckload (LTL) freight shipments. Further, the host server 2006 may determine other factors that affect the shipping costs by the carriers. For example, the host server 2006 can be programmed to determine a linear feet parameter for the shipment based on positional configurations of the one or more freight units and to determine whether the linear feet parameter for the freight unit exceeds a predetermined threshold value for the various carriers, where the linear feet threshold for each carrier is among the rules stored in the database 2010. The linear feet parameter may be the largest dimension, length, width, or height, of a shipment made up of a freight unit or plurality of freight units. Other shipping rules are described below.

In various embodiments, based on these rules stored in the database 2010, the host server 2006 determines, based on the rules stored in the database, the freight carriers who would agree to ship a freight unit matching the determined density-based class and/or linear feet parameter. Determining carriers that will ship a shipment may further include determining whether a dimension of the freight unit violates a predetermined threshold value for the corresponding shipping dimension specified by a carrier. For example, a particular carrier may not ship a product that is over 30 feet in length, and the host computer system 2002 may exclude that carrier from a listing based on a product that is to be shipped that is over 30 feet in length. The host server 2006 may also determine for display on a web page provided by the web server 2004 to the shipper, the respective shipping rates for the freight carriers to ship the freight unit. Additionally, where applicable, the web server 2004 may also or otherwise display a notice on the web page associated with one of the one or more carriers that indicates that a characteristic, such as, for example, a dimension (a length, width, and/or height) of the freight unit exceeds a predetermined threshold value. In another embodiment, the web page may display a notice that the freight unit has too great of a weight. In another embodiment, the web page may display a notice that the linear feet parameter of the freight unit exceeds a predetermined threshold value. For carriers whose rules permit the carrier to make the shipment, the host server 2006 can determine a ranking of the freight carriers by shipping cost (e.g., ascending order), and the web server 2004 can serve a web page to the client computer system 2016 of the shipper with the rankings via the network 2014. In addition, the ranking of the one or more carriers may be modified based on information associated with the carriers, for example, based on the time in transit or aspects of the cost associated with shipping. Additionally, upon receiving an input provided by the user, the web server 2004 may display a second web page that contains additional information about the shipment of the freight unit. For example, the second web page may comprise a plurality of shipping terminals for a selected carrier from the one or more carriers displayed on the first web page.

Upon being presented with the listing of one or more carriers that are capable of making the shipment, a user of the client computer system 2016 (e.g., a shipper) may then send a selection input through the network 2014 (e.g. by clicking a radio button or other icon on the web page with the shipping cost results) that indicates a selection of one of the listed freight carriers. After the host server 2006 receives the selection input, it can create an electronic bill of lading (BOL) file for the freight unit for the selected carrier. The electronic BOL file may comprise one or more 1D or 2D barcodes that provide information about the freight unit when read by a barcode reader. Further, the host computer system 2002 may transmit the electronic BOL to the carrier computer system 2024 of selected carrier via the network 2014. The information in the electronic BOL can be used to determine that the details regarding the shipment of the freight unit are correct and accurate.

The web server 2004 of the host computer system 2002 serves the web pages to the client computer system 2016 via a data communication network 2014. The data communication network 2014 can comprise one or more computer or data networks, such as LANs, WANs, MANs, the Internet, 3G or 4G networks, etc., and may comprise wired and/or wireless communication links. The host server 2006 computes the applicable shipping prices for the carriers based on shipping rules for the various carriers stored in the database 2008.

The carrier shipping rules include particular rules for each carrier that relate to how the cost to ship freight for that carrier is determined. In various embodiments, there can be a published Application Programming Interface (API) 2026 for host computer system 2002 that the carrier computer systems 2024 use to upload their particular carrier shipping rules to the host server 2006 via the network 2014 so that the rules can be stored in the database 2010. The API 2026 may specify the routines and protocols for software applications of the carrier computer systems 2024 to upload their shipping rules to the database 2008 of the host computer system 2002. When a carrier changes its rules, it can send the revised rules to the host computer system 2002 via an API 2028 of the web server 2018. In other embodiments, web pages hosted by web server(s) 2018 of the carrier computer systems 2024 can be scanned manually or by machine to collect the applicable shipping rules for storage in the database 2010. Also, in various embodiments, a carrier at a carrier computer system 2024 could upload files (e.g., spreadsheet files, CSV files, etc.) with the carrier's specific shipping rules to the host computer system 2002 via the network 2014 so that the carrier's specific rules can be stored in the database 2010.

The host computer system 2002, the client computer system 2016 and the carrier computer system 2024 can each be implemented by on or more networked computer devices, such as servers, laptops, PCs, mainframes, tablet computers, etc. Each such computer device comprises one or more processors and computer memory. The computer memory comprises primary and/or secondary storage devices. The primary storage devices can comprise RAM or ROM. The secondary storage devices can comprise HDDs, SSDs, flash memory, and other secondary storage devices. The primary and secondary storage devices can store data as well as software that is executed by the processors of the computer devices to perform the various computer functions described herein. For example, the client computer systems 2016 preferably include browser software for rendering the web pages from the host computer system 2002. In most cases the carrier computer systems 2024 will include a web server 2018 for hosting web pages about the carrier's capabilities and listing its particular shipping rules. The database 2010 can be, for example, a SQL database with a database management system (DBMS). The database 2008 can be implemented with a database server for running the DBMS software and with suitable memory (e.g., RAID disk arrays) for storing the data (e.g., the carrier-specific shipping rules).

As shown in FIG. 1A, the system 2000 could also comprise a measuring system 2012. The measuring system 2012 may measure one or parameters of the freight unit and then transmit the parameter values to the host computer system 2002 directly via the network 114 (along with an appropriate identifier for the freight unit so that the parameter values can be matched to the freight unit). In other embodiments, the measuring system 2012 can upload the measured parameter values for the freight unit to the client computer system 2016 for transmission therefrom to the host computer system 2002 via the network 2014. To that end, the measuring system could comprise an automated, vision-based and/or laser-based dimensioner (for measuring dimensions of the shipment) or a scale (for weighing the shipment). The dimensioner may measure the two-dimensional and/or three-dimensional shape of the shipment. The measuring system 2012 may also comprise a dedicated dimensioner device, such as a vision- and/or laser-based dimensioner, such as, for example, a BeeVision Dimensioner from 3DTIM Elektronik, a DM3610 dimensioner from DataLogic, or other suitable dimensioner device, or it could be a multi-purpose device that has a dimensioning function, such as a mobile device with a camera (e.g., a smartphone or tablet) and a dimensioner app for computing 3D volumes based on images captured by the camera. The measuring system may also comprise manual measuring instruments such as, for example, a tape measure, a laser tape measure, a ruler, or any device with calibrated lines for measuring distances. Furthermore, the host computer 2002 may be able to compare dimensions of a freight unit provided by the measuring system 2012 and compare those to the dimensions of the freight unit calculated by another party, for example, the carrier of the shipment, which may be provided to the host computer system 2002 by the carrier computer system 2024.

In embodiments where the measuring system 2012 transmits the measured parameter values directly to the host computer system 2002, the measuring system 2012 could also use an API (different from the API 2028 that is used by the carrier for uploading their shipping rules) for transmitting the parameter values to the host computer system 2002. The measuring system 2012 could be in communication with the network 2014 via a wired or wireless communication link (e.g., WiFi). In addition or alternatively, the measuring system 2012 could be in communication with the client computer system 2016 which receives the parameter values for the shipment from the measuring system 2012. The measuring system 2012 could be in communication with the client computer system 2016 via a wired or wireless (e.g., WiFi, Bluetooth) communication link.

Various general aspects of the present inventions and its advantages may be understood by referring to FIGS. 1-4. FIG. 1 illustrates an overall process, including certain sub-processes, for various embodiments of the present invention. The process begins when the user, from the client computer system 2016, submits shipment data at step 101 to a system, such as the host computer system 2002, where the shipment data is then subsequently validated at step 102. The shipment data may comprise information about a specified freight unit and/or one or more products that make up the freight unit as described above. The host computer system 2002 (e.g., the host server 2006) checks whether the data is valid at step 103, using the returned true or false value from the shipment data validation at the step 102 sub-process, which is described in further detail below in connection with FIG. 2. If the shipment data is not valid at step 103, the host computer system 2002 returns error messages to the user at step 104, so the data can be corrected and submitted again at step 101. If the shipment data is valid at step 103, the host computer system 2002 performs certain base calculations at step 105 to determine various characteristics of the shipment, with the process of step 105 being described in further detail below in connection with FIG. 3. The shipment data along with any modifications to the data resulting from step 105 are sent to the host computer system 2002 so that a base shipping rate and a shipping rate that has been negotiated with the carrier at step 106 is compared, following which the host computer system 2002 checks that the carriers and their shipping rates have been successfully returned at step 107 by the host computer system 2002 at step 106, and, if not, error messages are sent at step 104.

If the carriers and their rates are returned at step 107, then the request and response are stored in a database of the host computer system 2002 at step 108 (the database 2010 or another database of the host computer system 2002). The host computer system 2002 then gathers routing data and carrier rules from the database 2010 at step 109, and iterates over the carriers returned by the rater at step 110. The carrier specific data and rules are obtained from the tariffs and freight information for each carrier and stored in the database 2010, as described herein. The database 2010 stores this data and it is used by the host computer system 2002 to generate logic that is tested against metrics for each shipment, like weight and dimensions or density. The host computer system 2002 that returns the cost to move the freight unit in a particular lane based on review of the input shipment data. By way of further detail, the host computer system 2002 may generate a benchmark rate to show a user the previous costs for that user based on historical data (stored in the database 2010 or anther database of the host computer system 2002). The host computer system 2002, by execution of software instructions in its memory units, optimizes the rates that are returned according the pricing negotiated with the carrier and made official by a pricing agreement or contract often called a tariff. Further, carriers may eliminate certain carriers based on the carrier-specific shipping rules of the carriers or the tariffs associated with the carrier. For example, a carrier may specify that it cannot ship certain products that are over a certain length. Additionally, certain shippers may be predetermined to only use certain carriers, and this can be defined in the carrier-specific shipping rules. The host computer system 2002 may use a shipper with only certain carriers as a default when providing rates for a particular shipment. A shipper may also have negotiated or predetermined rates for their products for a carrier that may be different for other shipper/carrier relationships. For example, a linear foot rule may be customized by a shipper and/or carrier, such as, for example, where a 30 foot long pole company, may have a negotiated exception for violations of foot rules for a particular carrier.

The host computer system 2002 then preferably ensures that the carrier exists in the routing rules at step 111, and, if so may be marked appropriately, for example as "Program", and if not, the carrier may be marked appropriately, for example as "Non-Program", at step 113. If the carrier is marked as "Non-Program" at step 113, the analysis is skipped for the carrier at step 114. If the carrier exists in the routing rules at step 111, but is not routed as "Program" at step 112, the carrier is marked "Non-Program" at step 113 and analysis is skipped for the carrier at step 114. If the carrier is routed as "Program" at step 115, the host computer system 2002 checks to see if the carrier uses a special width and/or length determination at step 115, and, if so, the host computer system 2002 performs the base calculations again (similar to step 105) and passes the special width and/or length flag at step 116. If the carrier does not use special width determination at step 115, the host computer system 2002 continues by checking that the shipment is within the carrier's weight limit at step 117, and, if not, the carrier is flagged, for example as "Hidden", and a reason is set at step 118. If the shipment is within the carrier's weight limit at step 117, the host computer system 2002 ensures the shipment has dimensions at step 119, and, if not, the host computer system 2002 returns to skip the analysis for the carrier at step 114 then returns to step 110.

Thereafter, the illustrative process steps either continue to the next carrier starting at step 111, or the process exits the loop and continues with step 126. If the shipment does have dimensions at step 119, the host computer system 2002 checks that the shipment volume is within the carrier's limit at step 120, and, if it is not, the system must then check that the shipment's density is within the carrier's limit at step 121, and, if not, the carrier is flagged as "Hidden" and a reason is set at step 118. If the shipment's volume is within the carrier's limit at step 120, or, if the shipment's volume exceeds the carrier's limit at step 120, but the shipment's density does not exceed the carrier's limit at step 121; the host computer system 2002 checks to see if there are linear feet rules assigned for this customer and carrier at step 122, and, if so, Meta-Logic for testing conditions against shipment metrics to evaluate a true or false condition is built at step 123. Development of the Meta-Logic may include use of the concept of "meta programming." Meta programming is the concept of programmes that use other programmes as data or write themselves at runtime for instance. The concept of a programme writing itself, or portions thereof, can be applied to allowing a programme to generate its own logic conditions and cause them to be evaluated just in time. For instance a set of user-known or readable terms, representing fields, can be mapped in a database to a set of system-known terms that represent system variables, or can be mapped to system variables, can be used to define the possible fields used in a condition set, or structure. A set of possible comparison operators can be mapped to human-known terms in either a database or directly in the code as these are finite in nature and fairly static (>, <, ==, !=, etc, ... ). The same can be done with joining comparison operators (&&, ||). The mapping is done in this way so as to make this approach safe from allowing a user to inject malicious or even benign code into an application and causing it to be executed by not allowing the user to supply direct input to the application by forcing them to use known alias values mapped to unknown system values.

According to embodiments, a generic user interface may be designed to allow a user to take advantage of the available fields and operators in conjunction with user defined values as well as other field values for comparison to create complex conditional structures which support hierarchical grouping and execution, for example, to allow for the validity of one condition and/or to censor another. These kinds of logic structures may not be easily feasible in a statically defined implementation without excessive overhead. The logic structure, which is comprised of a number of conditions which can be grouped together in any permutation, then has its definition stored in a database for later use and evaluation just-in-time when needed. In one embodiment, to facilitate the use of this data to make just-in-time decisions comes down to structuring of the data prior to processing when retrieving it from the database and use of looping structures to generate a "Meta-Logic" string of is and Os in conjunction with comparison operations and grouping that can be safely evaluated by the system 2002.

To generate a Meta-Logic string, the testing conditions and shipment metrics described above can be structured similarly to how the evaluation is executed, in one embodiment via an associative array or a set of iterateable objects designed for the purpose of evaluation. Through nesting of arrays or objects, a representation of the original conditional test structure can be constructed. By iterating over the structured conditional data and evaluating each individual condition a string of Meta-Logic can be created by converting the Boolean result of each logical expression into an integer representation which is then added to the string. Once generated, this Meta-Logic can be evaluated as code and a final Boolean result determined. By using this method, the system 2002 may be configured efficiently and safeguarded against the potential of adding or removing field options. In one embodiment, where allowing the system 2002 does not directly evaluate any user submitted data, the system 2002 may remain secure, for example, by eliminating the opportunity for nefarious code to be passed to the system. Using Meta-Logic further allows the system 2002 to be adaptive and capable of being modified and maintained by users with minimal training on how logical expressions are evaluated and a clearly constructed, intuitive UI designed for the purpose of creating these logical structures that are used to generate Meta-Logic used to make just in time decisions based on dynamic conditions and may eliminate or reduce the need for training for some users.

The process for building the conditions to test against the shipment metrics is detailed more fully below in connection with the discussion of FIG. 4. The host computer system 2002 can now execute the Meta-Logic at step 124 and check that the result is valid at step 125, and, if not, the carrier is flagged as "Hidden" and a reason is set at step 118. If there are no linear feet rules available at step 122, or after executing the Meta-Logic at step 124, the result is valid at step 125, and the host computer system 2002 is able to then sort the remaining carriers by least cost at step 126 and return those carriers for display to the user at step 127.

Figure 2:
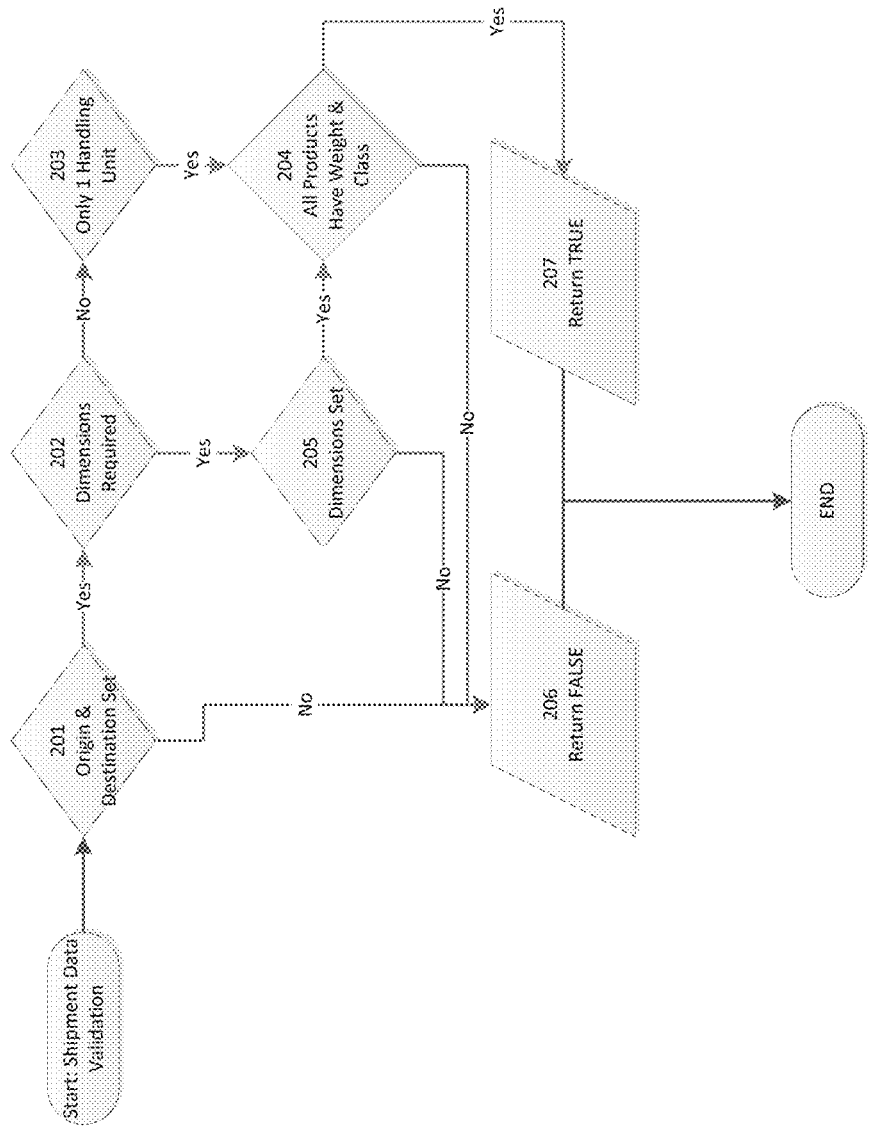
FIG. 2 is a flowchart showing the data validation sub-process of one embodiment of the present invention.

FIG. 2 illustrates the data validation sub-process according to one exemplary embodiment of the present invention. The data validation sub-process is shown at step 102 in FIG. 1. The submitted shipment data at step 101 may be subjected to various tests based on individual user or organizational priorities as well as internal system requirements, to make sure that all required data is available to get a shipping rate from the host computer system 2002. For example, some carriers may want customers/shippers to enter freight dimensions for optimization, while other do not because they only ship a standard sized package that does not violate any shipping rules of the specific carriers.

Referring again to FIG. 2, first a test is performed by the host computer system 2002 (e.g., the host server 2006) to ensure origin and destination data are set at sub-process step 201. If origin and destination data are not set at sub-process step 201, the host computer system 2002 returns a false value at sub-process step 206. If the origin and destination data are set at sub-process step 201, the host computer system 2002 then checks to see if the current customer's organization is required to enter dimensions at sub-process step 202. If dimensions are required at sub-process step 202, then a test is performed to check that the dimensions are present at sub-process step 205 for each handling unit submitted (a handling unit may be a type of freight unit). If dimensions are required at sub-process step 202 and dimensions are not set at sub-process step 205, then the host computer system 2002 returns a false value at sub-process step 206. If dimensions are required at sub-process step 202 and dimensions are set at sub-process step 205, the host computer system 2002 then performs a test to ensure all products have a weight and class at sub-process step 204. If all products have a weight and class at sub-process step 204, then the host computer system 2002 returns a true value at sub-process step 207. If one or more products are missing either a weight or a class at sub-process step 204, then a false value is returned at sub-process step 206.

If dimensions are not required at sub-process step 202, then a test is performed to ensure only one handling unit has been submitted at sub-process step 203. If more than one handling unit has been submitted at sub-process step 203, then the host computer system 2002 returns a false value at sub-process step 206. If only one handling unit has been submitted at sub-process step 203, then the host computer system 2002 checks that all products have both a weight and a class 204. If all products have a weight and class at sub-process step 204, then the host computer system 2002 returns a true value at sub-process step 207. If one or more products are missing either a weight or a class at sub-process step 204 then a false value is returned at sub-process step 206.

Figure 3:
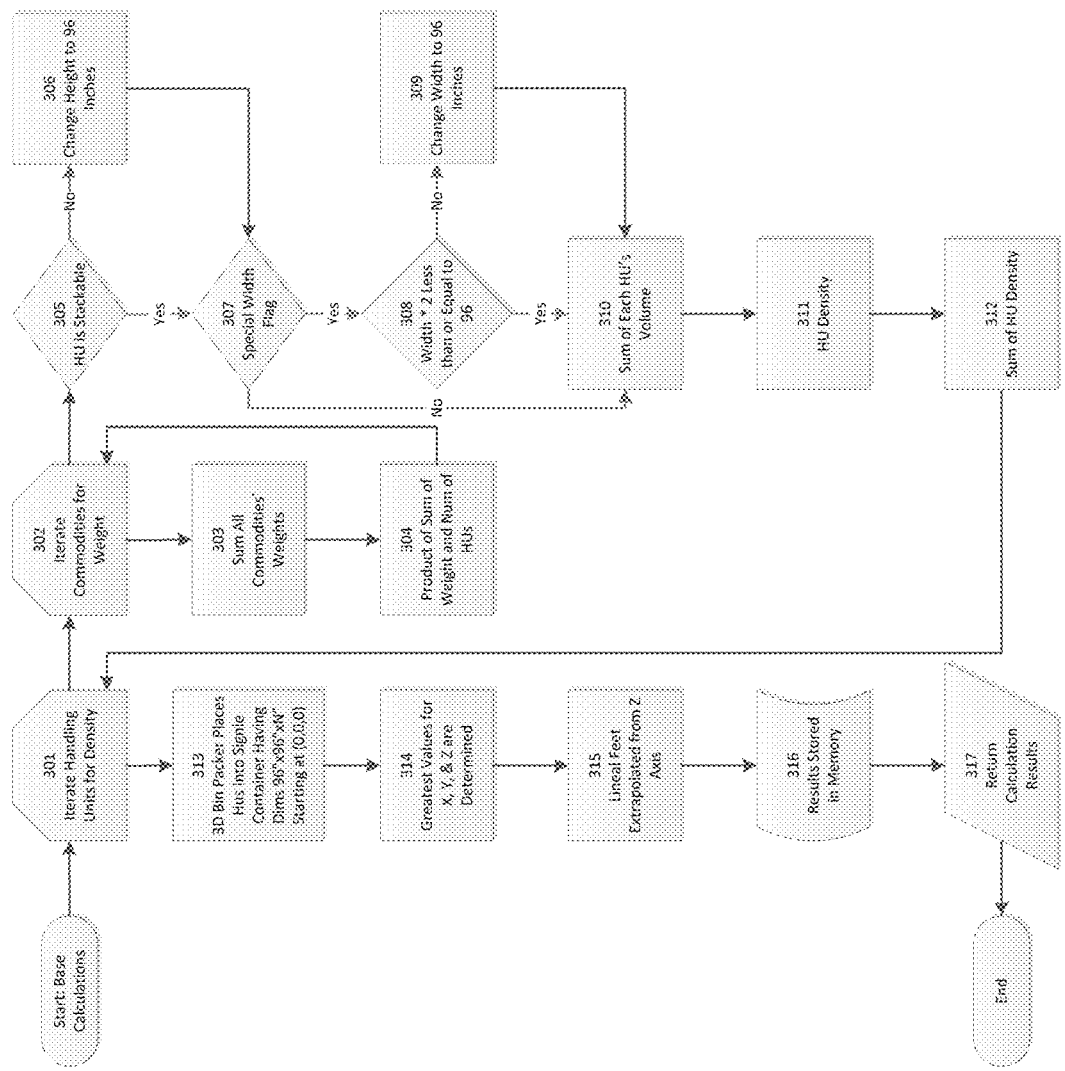
FIG. 3 is a flowchart showing sub-process used to perform the base calculations in one embodiment of the present invention.

FIG. 3 illustrates the sub-process used to perform the base calculations at step 105 for the host computer system 2002 to understand the shipment characteristics. The host computer system 2002 may iterate handling units to determine their density at sub-process step 301. The host computer system 2002 iterates over commodities for total weight at sub-process step 302 by first gathering the sum of all commodities' weights at sub-process step 303 and then the product of the sum of weight and number of handling units is taken at sub-process step 304. The host computer system 2002 then checks, based on data entered by the user (i.e., the user identifies if a handling unit such as a crate or box is stackable), whether the handling unit is stackable at sub-process step 305, and, if it is not, the height is changed to 96 inches at sub-process step 306 (other default heights could be used in other contexts). After the height is changed at sub-process step 306, or if the handling unit was stackable at sub-process step 305, the host computer system 2002 checks to see if the special width flag is set at sub-process step 307, and, if so, a test is then performed to ensure the width multiplied by a factor of 2 is not greater than 96 inches at sub-process step 308, and, if it is, then the width is changed to 96 inches at sub-process step 309. After the width has been changed at sub-process step 309, or if the special width flag was not set at sub-process step 307, the host computer system 2002 gathers a sum of each handling unit's volume at sub-process step 310, and then calculates the density as the quotient of the weight and volume at sub-process step 311, and the density is then summed at sub-process step 312.

The host computer system 2002 may then use a three dimensional bin packing algorithm to determine the appropriate placement of the handling units into a single container having non-arbitrary height and width of 96 inches (for example) and an indefinite arbitrary length at sub-process step 313. For example, in one embodiment, the bin packing algorithm is a combinatorial NP-hard problem solution. Following that step, the host computer system 2002 then determines the greatest values held for the X, Y and Z axes at sub-process step 314 and is then capable of extrapolating a value for the linear feet of the shipment based on the Z axis at sub-process step 315. The results of these calculations are then stored in memory at sub-process step 316 and the results returned to the main process at sub-process step 317.

Figure 4:
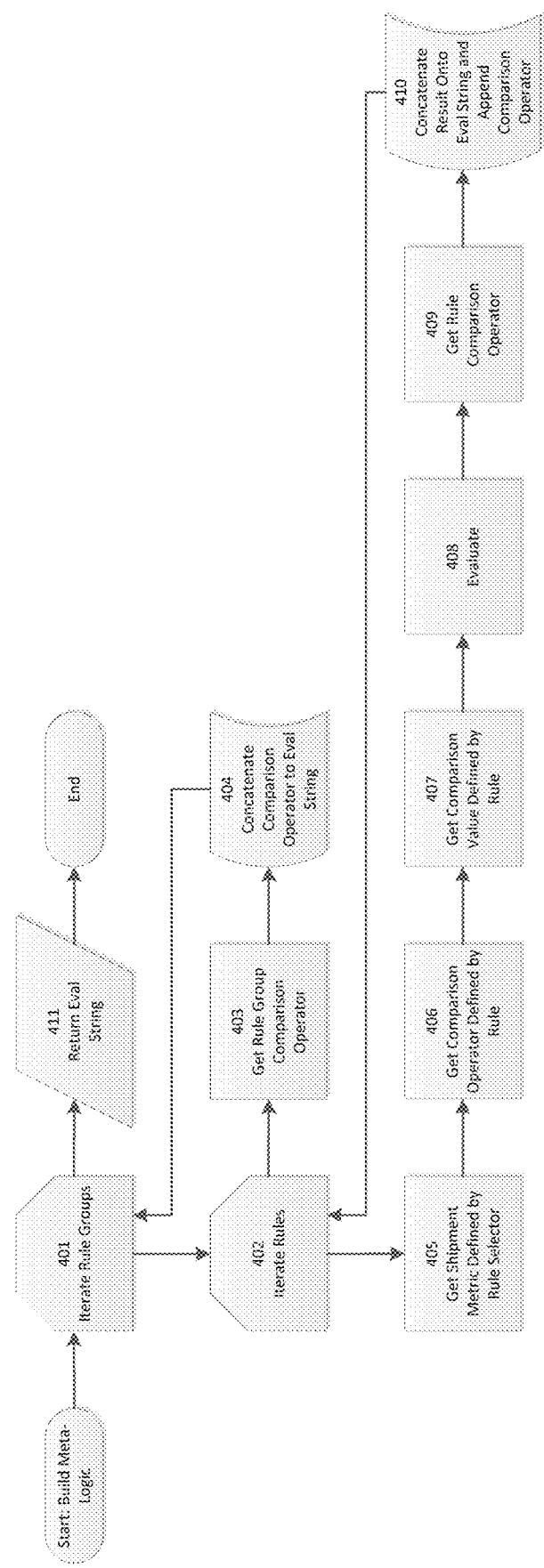
FIG. 4 is a flowchart showing the process by which Meta-Logic is built in the method of operation of one embodiment of the present invention.

FIG. 4 illustrates the process by which Meta-Logic is built at step 124 by the host computer system 2002 (e.g., the host server 2006). First the rule groups are iterated at sub-process step 401 and each rule is iterated at sub-process step 402. By way of further detail, each set of rules is comprised of one or more "rule groups" which is comprised of one or more "rules". The host computer system 2002 loops over each in a recursive fashion such that the system 2002 acts on each rule set. The host computer system 2002 gets the shipment metric defined by the rule selector at sub-process step 405. Next, the host computer system 2002 gets the comparison operator defined in the rule at sub-process step 406 and the comparison value defined by the rule at sub-process step 407, and evaluates the condition these elements create at sub-process step 408. Thereafter, gets the comparison operator for the next rule at sub-process step 409 and concatenates the result, which is a "1" or a "0" onto the Eval string, and appends the comparison operator at sub-process step 410. Next, the host computer system 2002 gets the rule group comparison operator at sub-process step 403 and appends it to the Eval string at sub-process step 404 and the Eval string can then be returned for processing at sub-process step 411.

Figure 5:
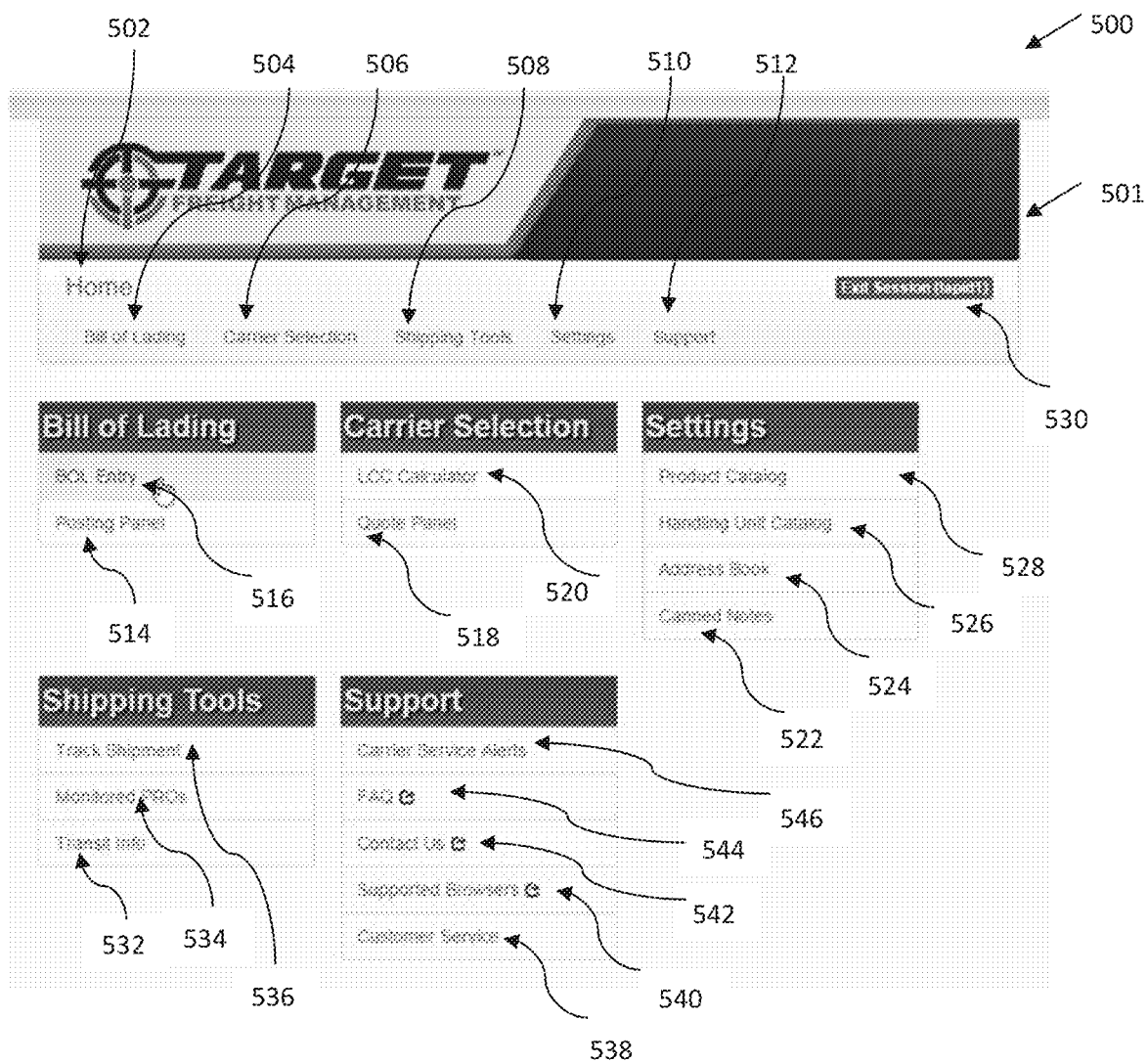

As mentioned previously, the web server 2004 may serve web pages to clients at the client computer systems 2016 through which a user can input parameter values for shipping a freight unit, viewing shipping rates computed by the host computer system 2002, and selecting a desired carrier based on the displayed rates. FIG. 5 displays an embodiment of a home screen web page 500 according to various embodiments of the present invention. As shown in FIG. 5, the home screen 500 includes a top level banner 501 that includes hyperlinks to screens for Home 502, Bill of Lading 504, Carrier Selection 506, Shipping Tools 508, Settings 510, and Support 512. Under the Bill of Lading banner, the user may activate hyperlinks to screens for the Posting Panel 514 and the BOL entry 516. Under the Carrier Selection banner, the user may activate the hyperlinks to screens for Quote Panel 518 and LCC Calculator 520. The Settings banner also includes hyperlinks to screens for Canned Notes 522, Address Book 524, Handling Unit Catalog 526, and Product Catalog 528 that the user may activate. The Shipping Tools banner includes hyperlinks to screens for Transit Info 532, Monitored PROs 534, and Track Shipment 536. The Support banner includes hyperlinks to Customer Service 538, Supported Browsers 540, Contact Us 542, FAQ 544, and Carrier Service Alerts 546. The user may also activate the "Exit Session" button 530 to log out of the host computer system. In various embodiments, the button 530 displays the name of the user.

Figure 6:
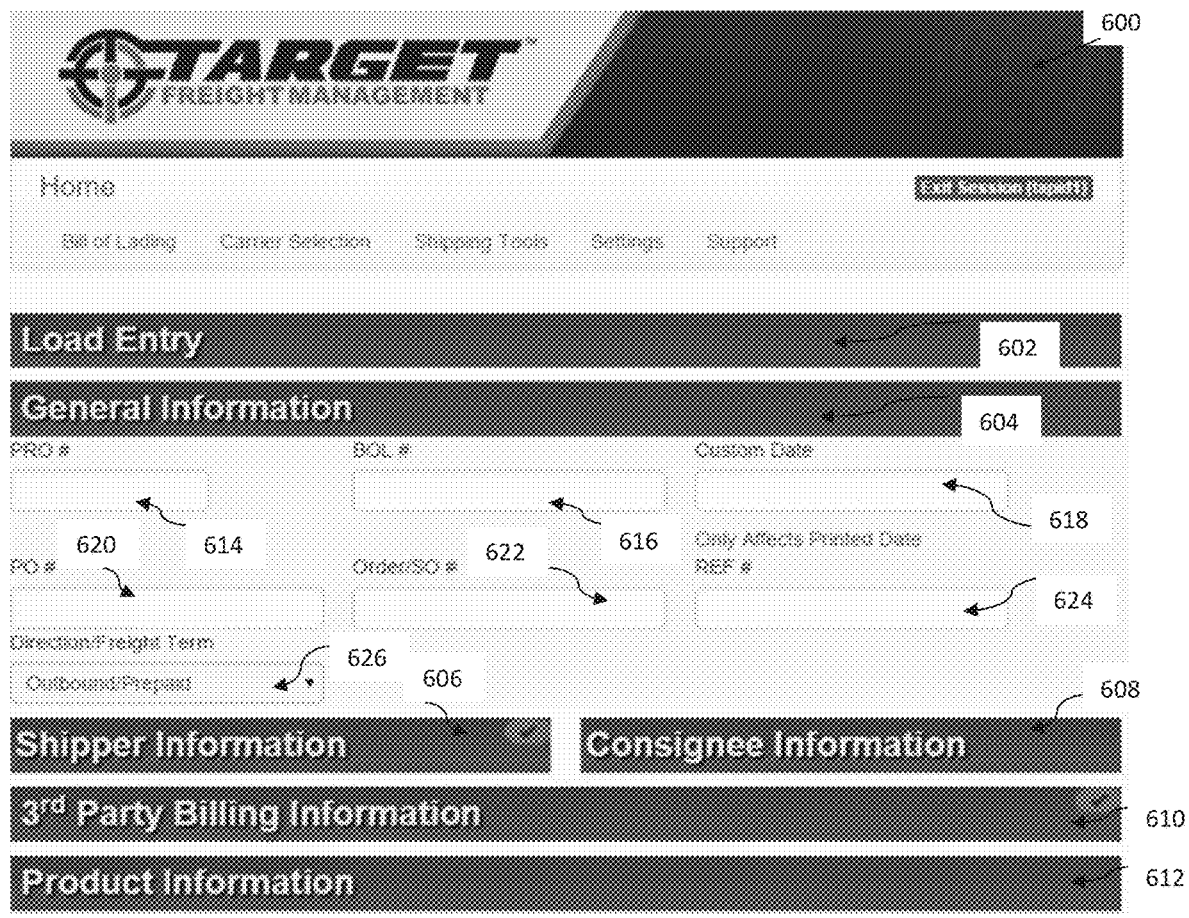

FIG. 6 displays the BOL Entry screen 600 that results when a user activates the BOL entry hyperlink 516. The screen 600 has banners for Load Entry 602, General Information 604, Shipper Information 606, Consignee Information 608, 3rd Party Billing Information 610, and Product Information 612. These banners are collapsible and expandable so that the user can tailor the display to their preference. In various embodiments, under the banner of Load Entry 602, the history information, BOL identification number and status of the loaded BOL may be displayed. Under the General Information banner 604, there are input fields for PRO#614, BOL#616, Custom Date 618, PO#620, Order/SO#622, REF#624, and Direction/Freight Term 626. At the BOL# input field 616, the user enters a BOL identification number uniquely identifying the BOL to be created. The PRO # input field 614 allows a user to input a PRO tracking number that tracks the status of a shipment. The PRO# is a carrier assigned tracking number and may be used as an invoice number. The user may input a desired custom date at field 618 for shipment of the products identified by the BOL# field at 616. At the PO# input field 620, the user enters a purchase order number identifying and authorizing a purchase transaction of the products comprising the shipment identified by the BOL.

Figure 7:
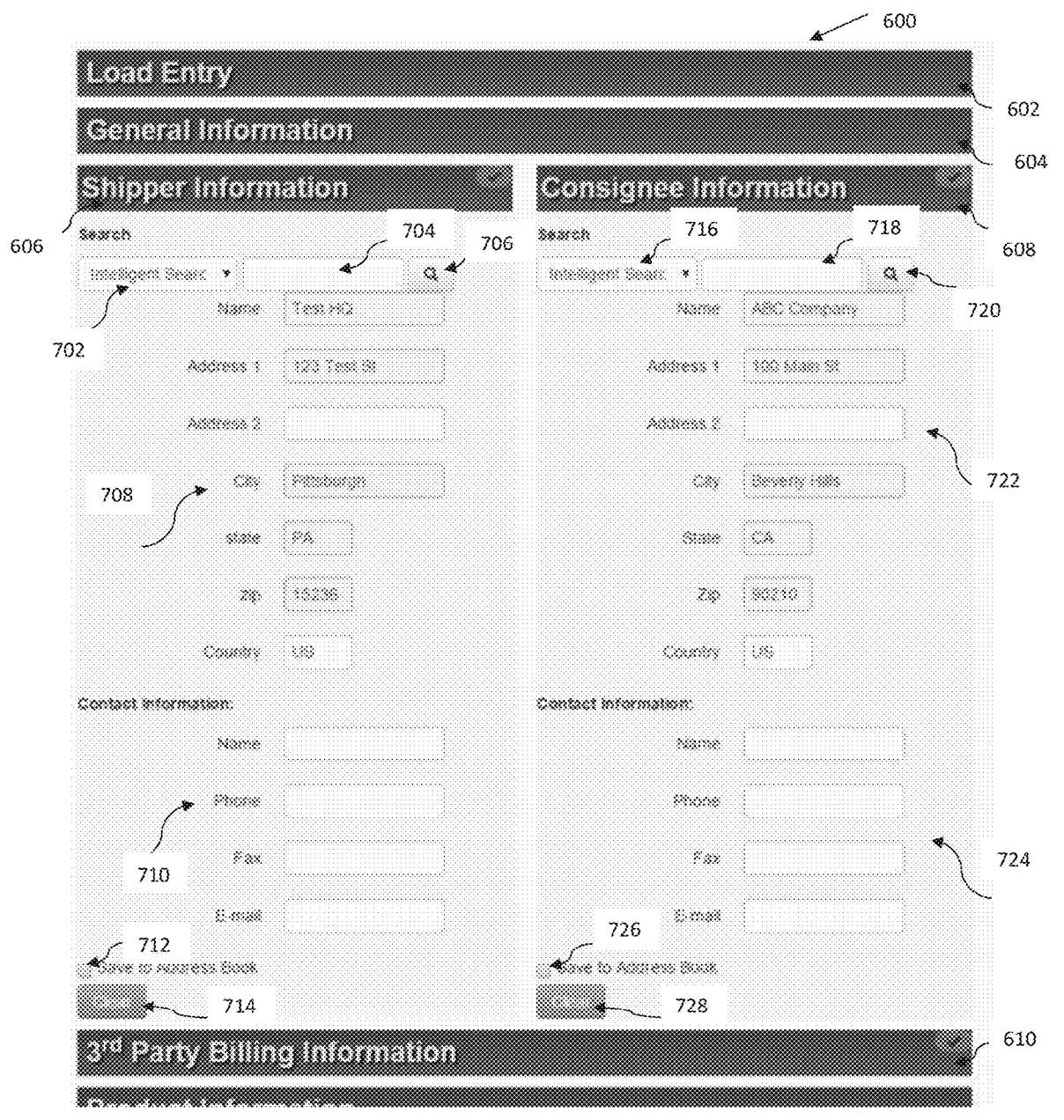

FIG. 7 displays the screen 600 with banners 606, 608 collapsed to display aspects of the web site. Under the shipper information banner 606, the user may click the search icon 706 and select "Intelligent Search" at the drop down menu of the Intelligent Search 702 to search for a previously saved shipper address. The search address field 704 displays the address selected by the user for searching. Based on the address input by the user, the shipper address may automatically populate the fields 708 for the shipper's address. The shipper address input fields 708 includes fields for inputting the address of the shipper. The shipper contact information fields 710 include fields for inputting the contact information of a contact designated by the shipper. The shipper contact information fields 710 may comprise name, phone, fax and email input fields. The user may save the contact information to an address book database on the host computer system by clicking the Save to Address Book radio button 712. If the user enters incorrect information or incorrect information is displayed at any of the input fields 704, 708, 710, the user may activate the "Clear" button to eliminate all characters currently displayed at those input fields.

Under the consignee information banner 608, the user may click the search icon 720 and select "Intelligent Search"

at the drop down menu of Intelligent Search 716 to search for a previously saved consignee address. The search address field 718 displays the address selected by the user for searching. Based on the address input by the user, the consignee address may automatically populate at the consignee address 722. The consignee address 722 includes input fields for the address of the consignee. The consignee contact information 724 includes input fields for inputting the contact information of a contact designated by the consignee. The user may save the contact information to an address book database on the host computer system by clicking the Save to Address Book radio button 726. If the user enters incorrect information or incorrect information is displayed at the input fields of 718, 722, or 724, the user may activate the "Clear" button 728 to eliminate all characters currently displayed at the input fields 718, 722, or 724. In various embodiments, when the user enters either the shipper address at 708 or the consignee address at 722, the web site contemporaneously suggests addresses similar to the address indicated by the text of input fields "Address 1" at shipper address 708 and at consignee address 722, as the user inputs the text into the input fields.

Figure 8:
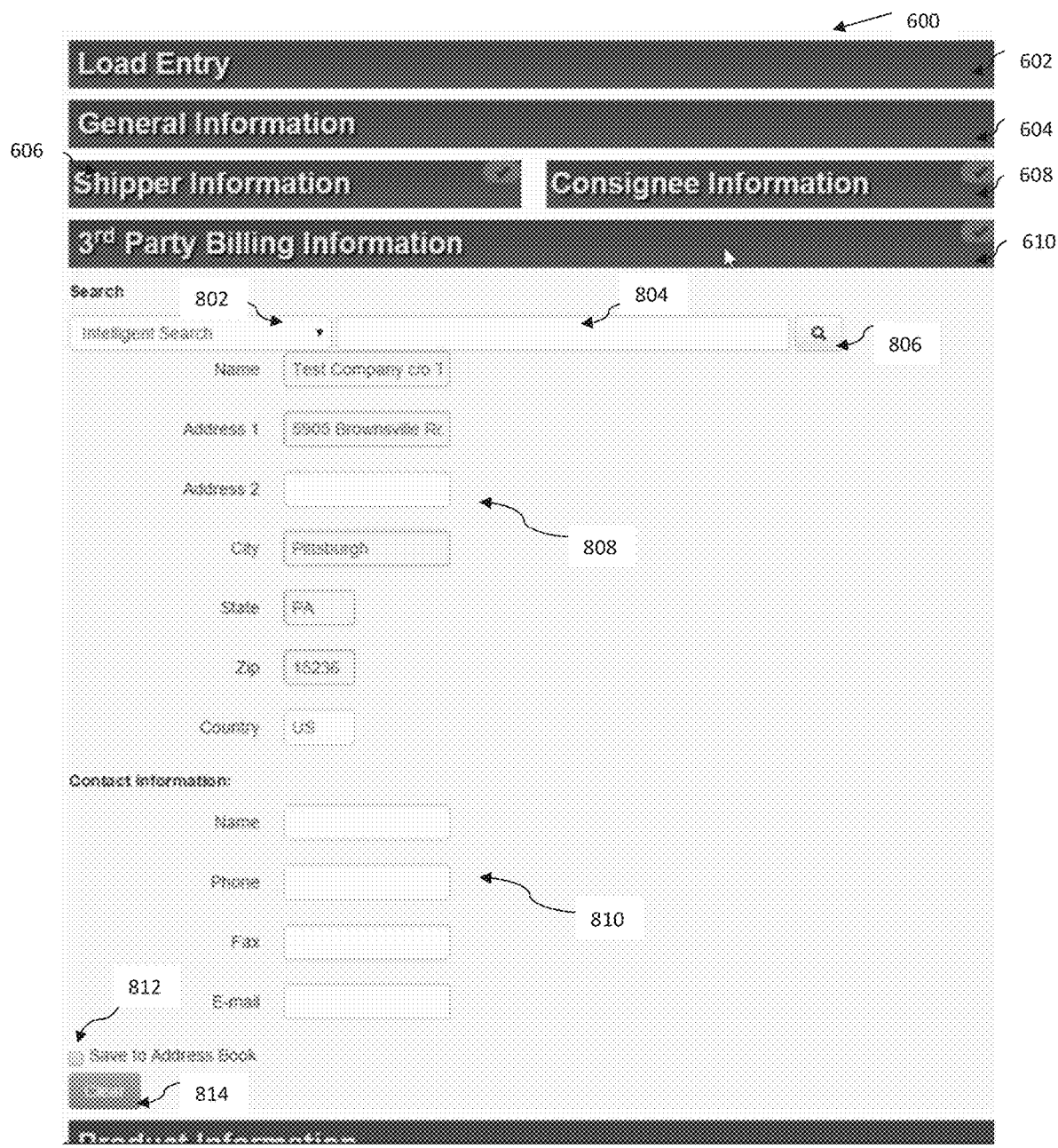

FIG. 8 presents an example of the screen 600 with banner 610 collapsed. Under the 3$^{rd}$ Party Billing Information banner 610, the user may click the search icon 806 and select "Intelligent Search" at the drop down menu of Intelligent Search 802 to search for a previously saved third party address. The search address field 804 displays the address selected by the user for searching. Based on the address input by the user, the web server 2004 may automatically populate the third party address fields 808. The third party address fields 808 includes input fields for the address of the third party and may comprise name, street, city, state, zip code, and country. In various embodiments, the third party address may indicate the availability of negotiated shipment pricing in another icon or field displayed under the 3$^{rd}$ Party Billing Information banner 610. The third party contact information fields 810 include fields for displaying the contact information of a contact designated by the third party. The contact information may comprise name, phone, fax and email. The user may save the contact information to an address book database on the host computer system by clicking the Save to Address Book radio button 812. If the user enters incorrect information or incorrect information is displayed at the third party contact information fields 810, the third party address fields 808 or the search address field 804, the user may activate the "Clear" button 814 to eliminate all characters currently displayed in fields of 804, 808, or 810.

Figure 9:
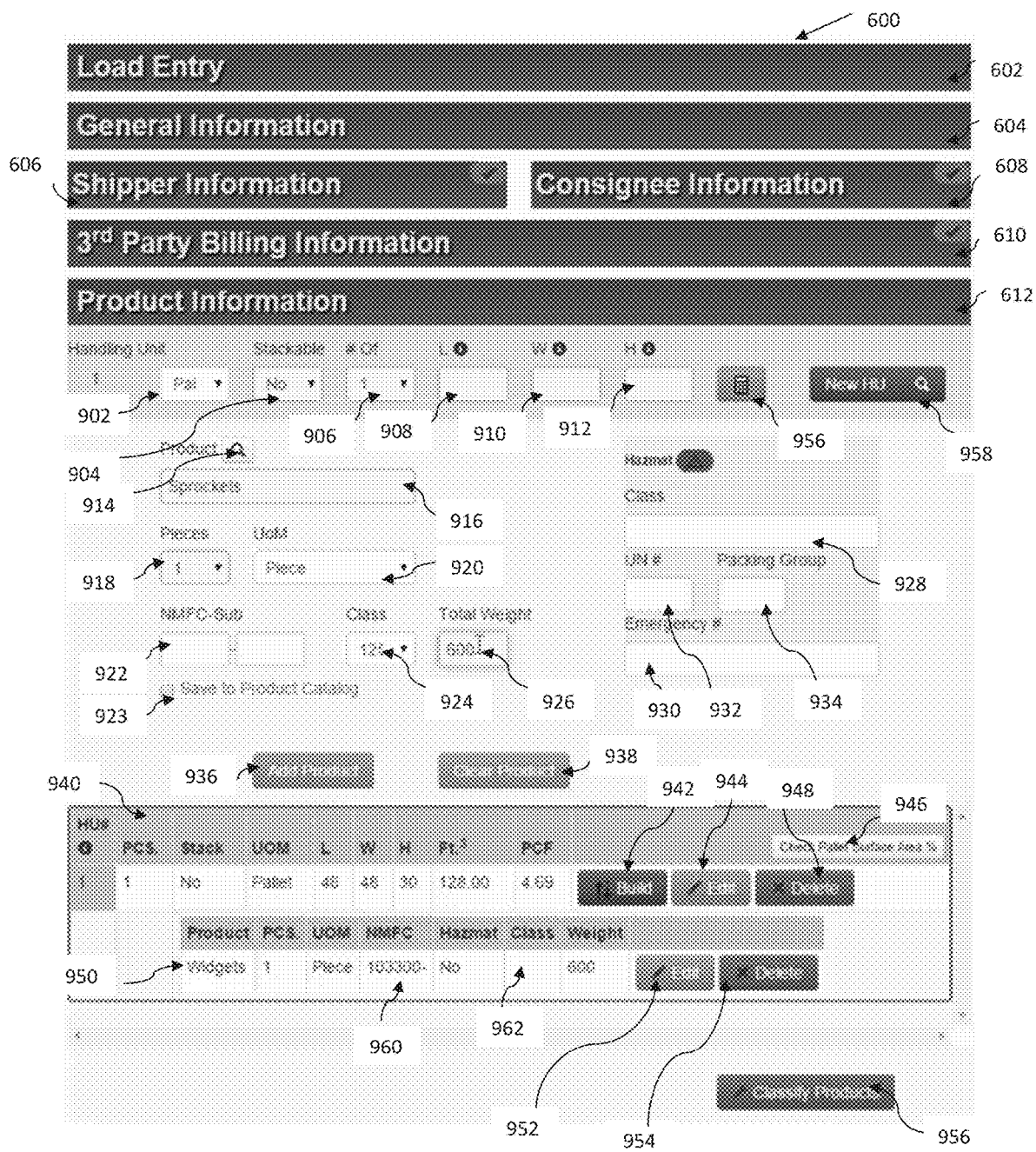

FIG. 9 shows an example of the screen 600 with banner 612 collapsed. Under the Product Information 612, the user enters information about the freight unit transporting the product such as the freight unit type, stackable nature, and dimensions. The information describes a freight unit, such as a handling unit, that comprises at least a portion of a shipment. For example, the user may enter handling unit data into the drop down menus for Pallet 902, Stackable 904 and Number 906. The drop down menu 902 indicates whether the handling unit comprises pallets and the drop down menu 904 indicates whether the handling unit possesses a stackable quality. A stackable quality may enable a particular shipment to accommodate more quantities of a particular type of handling unit. If at the drop down menu 904, the user inputs that the handling unit is not stackable, the web server may use the default height of the handling unit corresponding to a conventional truck height, as described above. This default height may affect the shipping rate charged for shipping the handling unit, as described below. As shown in FIG. 9, the menu 906 allows the user to input the number of pallets in the shipment. The user may also input the dimensions of the handling unit at the Length, Width, and Height input fields 908, 910, and 912, respectively. One or more of these fields could be auto-populated based on dimension information receiving from the measuring system 2012 in various embodiments as described above.

After the user inputs the information at the drop down menus 902-906 and input fields 908-912, the user may activate the "New HU" button 958 to create a new handling unit with the entered handling unit data. After the button 958 is activated, a new handling unit entry appears at the handling unit tabular data structure 940, which identifies the handling units on the shipment with a handling unit index number in a first column of the tabular data structure 940. Further, a handling unit may comprise one or more products. Accordingly, a user may click the search icon 914 to search a product catalog for a particular type of product that is included in a handling unit. Once the user selects the appropriate product for the handling unit (or accordingly, the shipment), the product input field 916 displays the name of the selected product. Products may also be described by a unit of measure. For example, a user may select a unit of measure by clicking the corresponding entry at the drop down menu for UoM 920 and then enter the corresponding number of pieces for the selected product using the drop down menu 918 for the number of pieces. The input fields 922, 924, 926 are for the user to input the NMFC-Sub, Class and Total Weight, if applicable and available. NMFC-Sub is the classification assigned according to the National Motor Freight Classification. Class refers to a particular number on a classification scheme based on density. For example, the scheme may measure density by pounds per cubic feet. Total weight refers to the total weight determined by a measuring unit or system such as pounds.

If a product possesses dangerous characteristics, the user may input data indicating those characteristics at the Hazmat group comprising input fields 928, 932, 934, and 930, which are for Class, UN #, Packing Group, and Emergency Number. To add a product described by the input fields 918-934 to a handling unit created at 958 and listed at the data structure 940, a user may activate the "Add Product" button 936. If the user desires to delete the information currently input at one or more of the fields 918-934, the user may activate the "Clear Product" button 938. The user may also activate button 936 to add the product with different information. The handling unit tabular data structure 940 may contain the data input at the drop down menus 902-906, 918-920, 924 and input fields 906-912, 922, 926, and/or the search icon 914.

Also in screen 600, the product display field 950 displays the product contained within a handling unit specified in the handling unit tabular data structure 940. The user may edit the data previously input at the menus 902-906 and the fields 908-912 that describes a created handling unit by activating the "Edit" button 944. The user may also build a row for a handling unit in the handling unit tabular data structure 940 by activating the "Build" button 942. The user may also delete a row representing a handling unit by activating the "Delete" button 948. Similarly, the user may edit a product described by the data previously input at 918-934 by activating the "Edit" button 952. In embodiments, the user may save those edits to the handling unit by activating an appropriate button. The user may also delete a product row for a handling unit in the handling unit tabular data structure 940 by activating the "Delete" button 954. The product added using button 936 can be a density based product or a non density based product and the host computer system 2002 (e.g., the host server 2006) may be programmed to determine whether or not a product is a density based product for the purpose of determining the shipping rate for that product. In various embodiments, the user may click the Save to Product Catalog radio button 923 so that a product with predetermined characteristics such as, for example, the NMFC classification input in the field 922 is saved to the product catalog displayed at the Found Multiple Products window 1002, described with regard to FIG. 10. If the product is a non density based product, the user may fill out the appropriate NMFC-Sub, class, and total weight input fields 922, 924, and 926, respectively. However, if the product is a density based product, the host computer system 2002 may automatically populate the NMFC-Sub field 922 with the corresponding NMFC identification number in the NMFC display field 960. The user may also activate the "Check Pallet Surface Area %" button 946 to determine the percentage of the surface area of the pallet that is used/covered by the commodities on the pallet, i.e. the sum of the surface area occupied by all items. In addition, after the user activates the "Classify Products" button 956, the class display field 962 may automatically populate with the corresponding class number. The automatically populating data at the field 962 is calculated by the host computer system 2002 using the total weight entered at field 926 and the dimensions of the handling unit entered at fields 908, 910, and 912.

Figure 10:
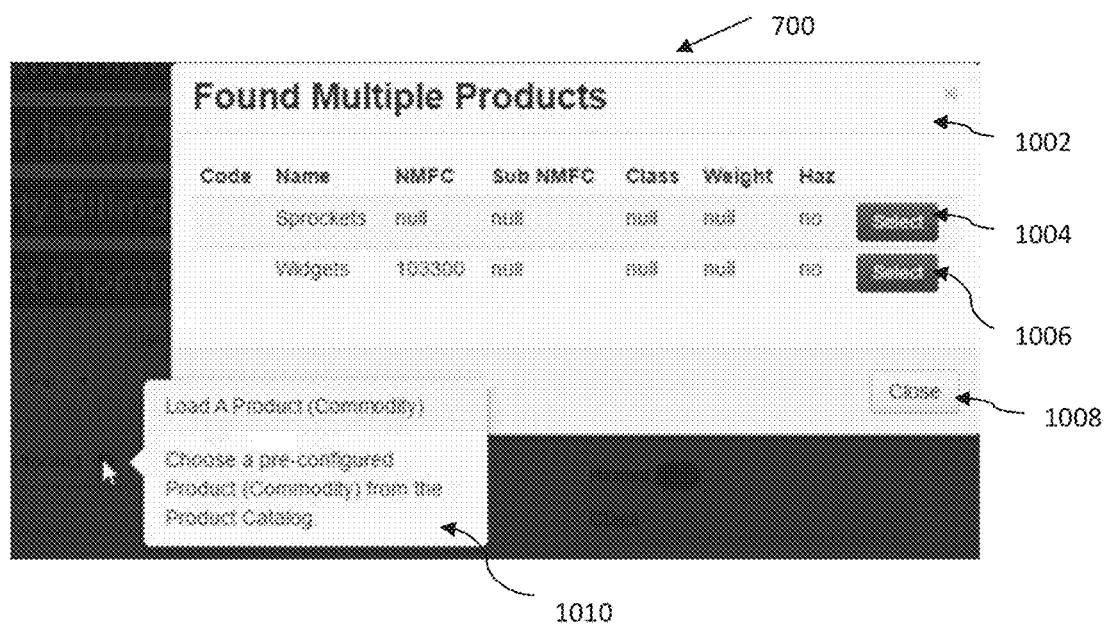

FIG. 10 illustrates one embodiment, where, after activation of the search icon 914 described with reference to FIG. 9, a Found Products screen 700 appears. The screen 700 comprises a Found Multiple Products window 1002 that contains a "Select" button 1004, 1006 for each named product. For example, the user may activate the "Select" button 1004 on the Found Multiple Products window 1002 to load a pre-configured product from the product catalog into the product input field 916. The user may also load a different pre-configured product into the field 916 by activating the "Select" button 1006. After the user selects the desired product, the user may leave the Found Multiple Products window 1002 by activating the "Close" button 1008. Further, window 1010 describes the function of the search icon 914. In one embodiment, the window 1010 describes that by activating the search icon 914, the user may choose a product from the product catalog depicted in the window 1002.

Figure 11:
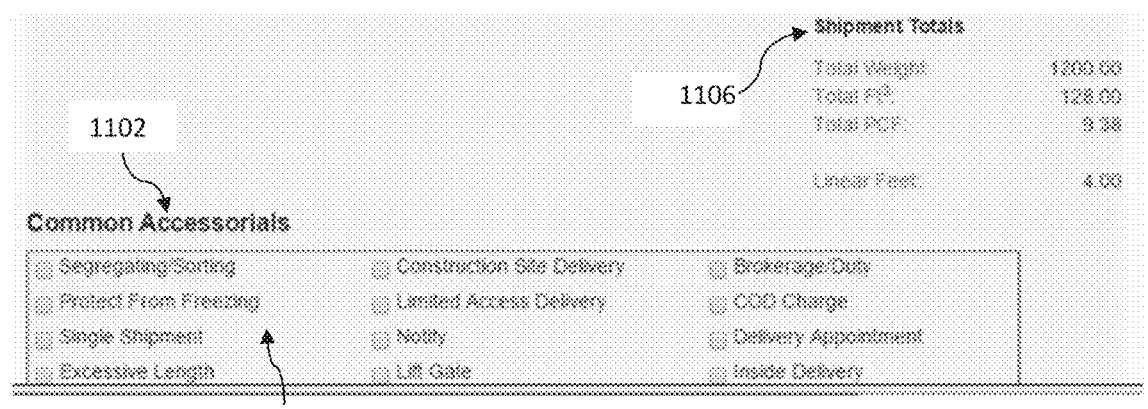

Additionally, FIG. 11 illustrates an embodiment of a portion of the screen 600 that presents a summary and accessorials aspects of the Product Information 612 described with regard to FIG. 9. The Common Accessorials field 1102 consists of a group of radio buttons 1104 identifying various accessorials that may be selected. The selected accessorials may increase the cost of shipments in exchange for additional services. In embodiments, such services may include segregating/sorting, protect from freezing, single shipment, excessive length and construction site delivery. The user may select an accessorial by clicking on the corresponding radio button of the group 1104. The shipment totals field 1106 displays shipment information such as the total weight, total cubed feet, total pounds per cubic feet, and a linear foot parameter of the total shipment.

In general, the host computer system 2002 is programmed to determine whether the product selected or provided by the user should be density-based. In one embodiment, this determination may be made based on preexisting classifications of products as being density base or non-density based and product information provided by a user to the host computer system 2002. A density-based product means that the shipping rate calculated for that product depends on the density of the product. When the user inputs the total weight at the field 926 for a density-based product, the web page 600 may include summary information about a handling or freight unit. The total pounds per cubic feet of the product may be displayed at the shipment totals field 1106, shown in FIG. 11. When the user activates the "Classify Products" button 956, the host computer system 2002 determines the class number and sub class based on the total weight and dimensions from the fields 908, 910, and 912. The class number and subclass are both determined based on the density of the handling unit, with the determined sub class is displayed at the display field 960 while the class is displayed at the display field 962. In various embodiments, the sub class is determined based on the NMFC classification system. For example, sub class 04 and class 150 are assigned to freight units with a density between 4 to 6 pounds per cubic feet (PCF), while sub class 05 and class 125 are assigned to freight units with a density between 6 to 8 pounds per cubic feet (PCF). The dimensions comprise a linear feet parameter displayed at the field 1106. After determining the linear feet parameter exceeds the predetermined threshold value, the web server displays a second web page comprising a notice associated with one of the one or more carriers that indicates the linear feet parameter of the freight unit exceeds a predetermined threshold value. In one embodiment, the host computer system 2002 calculates the volume independent of the linear feet parameter and then uses the volume calculation to determine the density.

According to embodiments, the host computer system 2002 may be programmed to determine whether each of the one or more freight units satisfies a surface area container rule. In one example, if the product on top of a freight unit container doesn't take up 65% of the surface area, then the product may become classified as a density based product or the method for calculating a shipping rate for the product may change. Accordingly, once the host computer system 2002 determines that one or more freight units does not satisfy a surface area container rule, the host computer system may then default to using the height of the shipping compartment used by the carrier, such as, for example, the height of the box of a truck, but the length and the width are still based on the dimensions of the container. The height may be used in calculating a density of the freight unit and then the density based class for the product. This may be a scenario where the surface area of the container that is covered by product is not enough to allow for stacking of other containers. A carrier may decide to charge a different shipping rate than if the product took up a larger portion of the surface area of the container. Accordingly, in one embodiment, where a freight unit comprises a container, such as, for example, a pallet, that has a total surface area defined by the length and the width dimensions for the container, the host computer determines whether a freight unit satisfies the surface area container rule by determining a ratio of a surface area of the container covered by the products on the container compared to the total surface area of the container and determines whether the ratio exceeds an applicable surface area threshold value. The host computer 2002 may also determine a shipping rate by, for each freight unit that is below the applicable surface area threshold value, using a density based classification for the freight unit, and the density of the freight unit may be determined based at least on the dimensions of the container. In another embodiment, where a shipment comprises freight units of different sizes, for example where a shipment comprises multiple pallets, at least one of which is a different size than others, the host computer system 2002 may determine, based on the carrier specific shipping rules, that a particular carrier will treat the at least one pallet with the different size the same as other pallets or it may be treated separately based on the specific size of that pallet.

Once the particulars for a freight unit are input by the user, the host computer system 2002 determines the carriers who are capable of shipping the freight unit based on the density-based class and/or the linear feet parameter and the carriers' specific shipping rules. For each carrier that is capable of carrying the freight unit, the host computer system 2002 also determines a shipping rate for the handling or freight unit. An example of a web page provided by the web server 2004 with a listing 1205 of the carriers is listing shown in FIG. 12. Preferably, the carriers may be sorted in the listing 1205 by ascending shipping cost.

Figure 12:
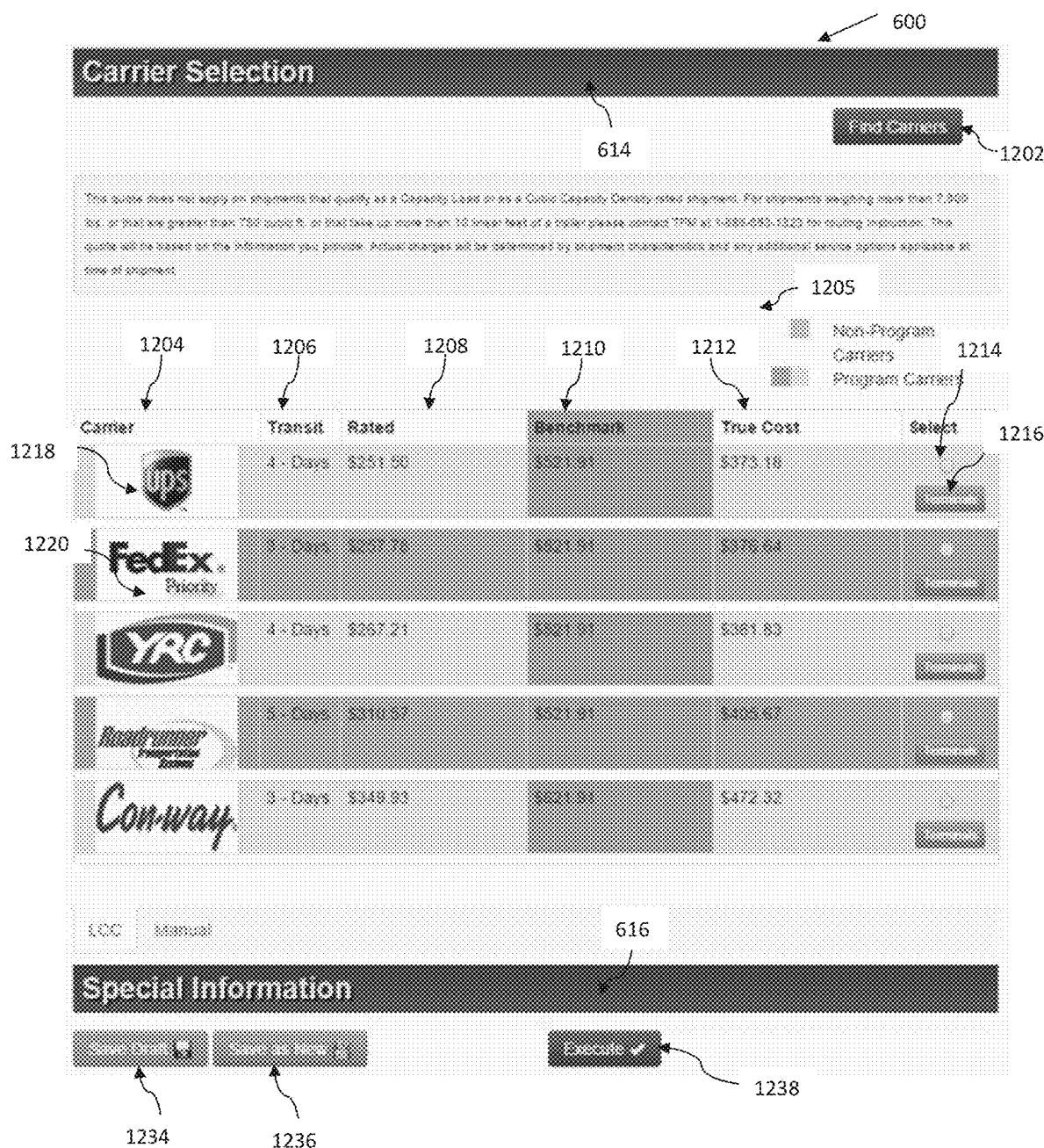

FIG. 12 shows an example of the web page 600 with the carrier selection banner 614 expanded. Under the Carrier Selection 614, the user activates the "Find Carriers" button 1202, which prompts the host computer system 2002 to determine the carriers capable of making the shipment, and their respective shipping costs, as described above, with the results shown in the listing 1205. In various embodiments, when the user activates the "Find Carriers" button 1202, the web site generates a warning to the user informing the user that the text of input field "Address 1" at consignee address 722 indicates a residential address. If the user acknowledges the warning by activating an "OK" button, the web site automatically adds residential delivery as an accessorial by checking the corresponding radio button at 1104. The costs associated with residential delivery are added to the quoted prices and pricing information may be displayed at columns 1208, 1210, 1212 of the listing 1205.

Referring to the listing 1205, the columns 1204-1212 include information about the transit time, terminals and cost of a specific carrier service. Each row identifies a particular shipping carrier that offers a service, along with the relevant shipping time and rates for each carrier. For example, row 1218 identifies UPS while row 1220 identifies FedEx. In various embodiments, the Carrier column 1204 displays carrier logos, the Transit column 1206 displays the corresponding transportation time required to transport the shipment to its final destination, the Rated column 1208 displays a cost of shipping by the carrier for the freight unit, the Benchmark column 1210 displays a cost of shipping by the carrier based on historical information for a similar freight unit, and the True Cost column 1212 displays a cost to user to be paid to the institution that manages the host computer system 2002. In one embodiment, the number displayed in the True Cost column 1212 is derived from a cost optimization process for shipping the freight unit along with a sur-charge for the optimization process. The sur-charge may represent a portion of the difference between the number of in the Rated column 1208 and the Benchmark column 1210. The freight shipping rates for the various carriers are determined based on the carrier-specific shipping rules stored in the database 2010 described above. The determination of which carriers will ship a freight unit with a particular density class and linear feet parameter is also based on these rules. The host computer system 2002 generates the ranking of the carriers based on the stored rules, preferably in ascending order by True Cost. The listing 1205 also indicates whether a carrier in the column 1204 is a program carrier or a non-program carrier. This may be indicated by different shading in the rows of the listing 1205 or by another sufficient indication.

The web server 2004 can receive a selection input for a selected carrier from the user when the user activates the associated radio button from the group of selection input radio buttons 1214 to indicate the selected carrier. For example, a user may select an associated radio button 1214 to select a specific carrier such as UPS, FedEx, YRC, Roadrunner and Conway in the example shown in FIG. 12. In various embodiments, the user may also sort the information shown in listing 1205 according to a desired column metric listing by clicking on any of the Transit, Rated, Benchmark or True Cost columns headers 1206, 1208, 1210, and 1212, respectively. For example, when the user clicks the header of column 1208, the rows of the listing 1205 are sorted such that the carrier with the lowest value in Rate column 1208 becomes the first row, the carrier with the second lowest value in Rate column 1208 becomes the second row, and so on.

Under the banner of Special Information 616, the user may activate the "Save Draft" button 1234 to save a draft of a BOL created through aspects of the screen 600. If the user has completed editing the BOL draft, the user may activate the "Save as New" button 1236 to save the BOL draft as a new BOL. Activation of the button 1236 also generates a new BOL identification number for the BOL and changes the status of the BOL to "On-Hold". In embodiments, the new BOL can be used to generate an electronic BOL file with the information input by the user. The BOL may be generated in portable document format (PDF) or other file format as appropriate. The user activates the "Execute" button 1238 to generate a printable PDF BOL. Activation of the button 1238 also initiates a final save of the BOL and changes the status of the BOL to "executed". In other embodiments, the web server may electronically transmit the PDF BOL to the carrier that the user selected. In other embodiments, under the banner of Special Information 616, the user may activate "Save as New" button 1236 to save the loaded BOL as a new BOL. In one embodiment, this may generate a new BOL ID number as well. Accordingly, the user may reuse and edit the new BOL.

Figure 13:
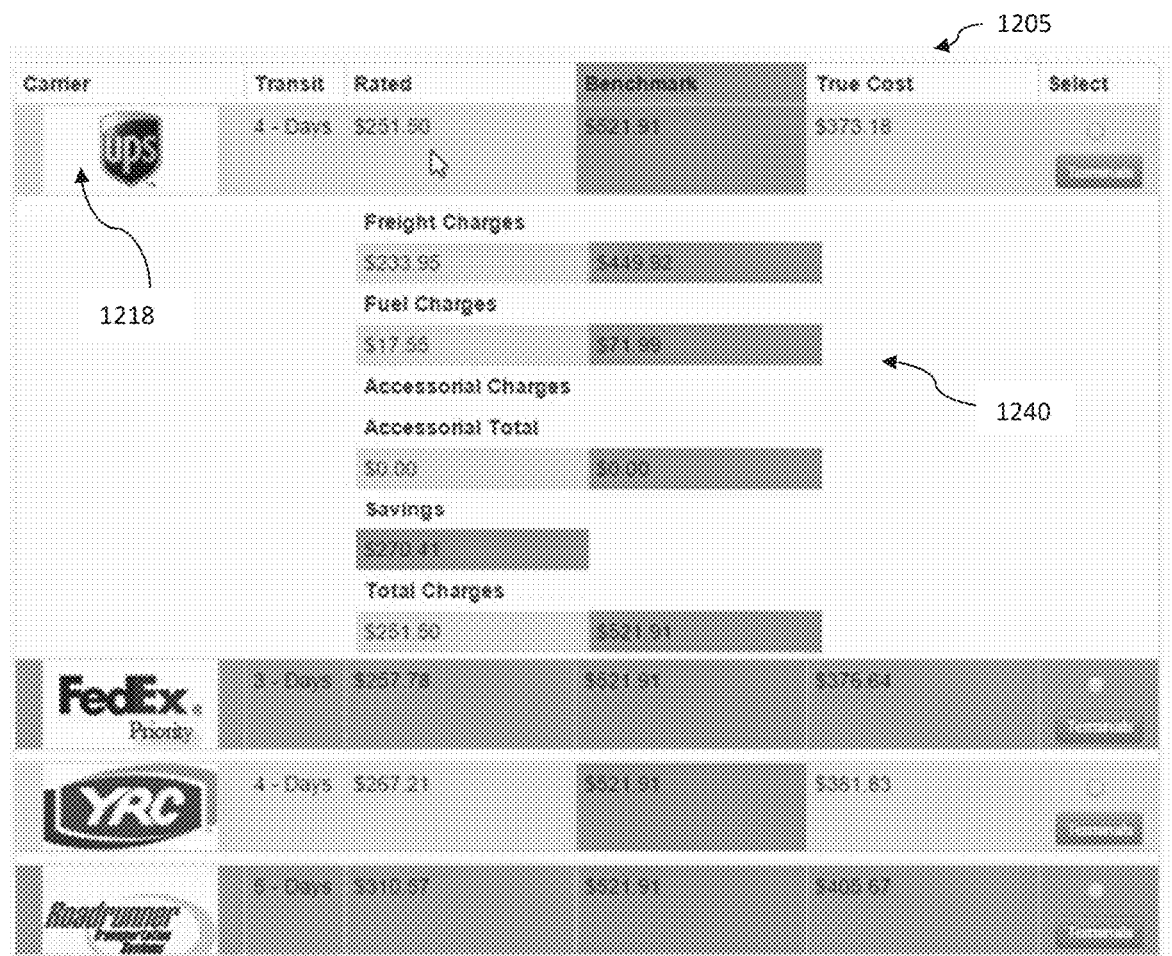

FIG. 13 shows the first row 1218 of the listing 1205. The row 1218 may be expanded to display information about the cost of a shipment for a carrier. At the charges data breakdown 1240, the charges associated with the Rated column 1208 are presented next to the charges associated with the Benchmark column 1210. Each of the information in the Rated column 1208 and Benchmark column 1210 displays freight charges, fuel charges, and accessorial charges. The information in the Rated column 1208 indicates the freight optimized cost components of the cost of shipping by the carrier for the freight unit. The information in the Benchmark column 1210 indicates the non freight optimized cost components of the cost of shipping by the carrier based on historical information for a similar freight unit. The freight charges display fields include the freight optimized cost of the freight charges component and the non optimized cost of the freight charges component under the columns 1208, 1210, respectively. The fuel charges display fields include the freight optimized cost of the fuel charges component and the non optimized cost of the fuel charges component under the columns 1208, 1210, respectively. The accessorial charges display fields include the freight optimized cost of the accessorial charges component and the non optimized cost of the accessorial charges component under the columns 1208 and 1210, respectively. Under the Rated column 1208, the savings field displays the difference between the "Benchmark" and the "Rated" costs. This cost is an amount saved through the use of embodiments of the present invention.

Figures 14A, 14B:
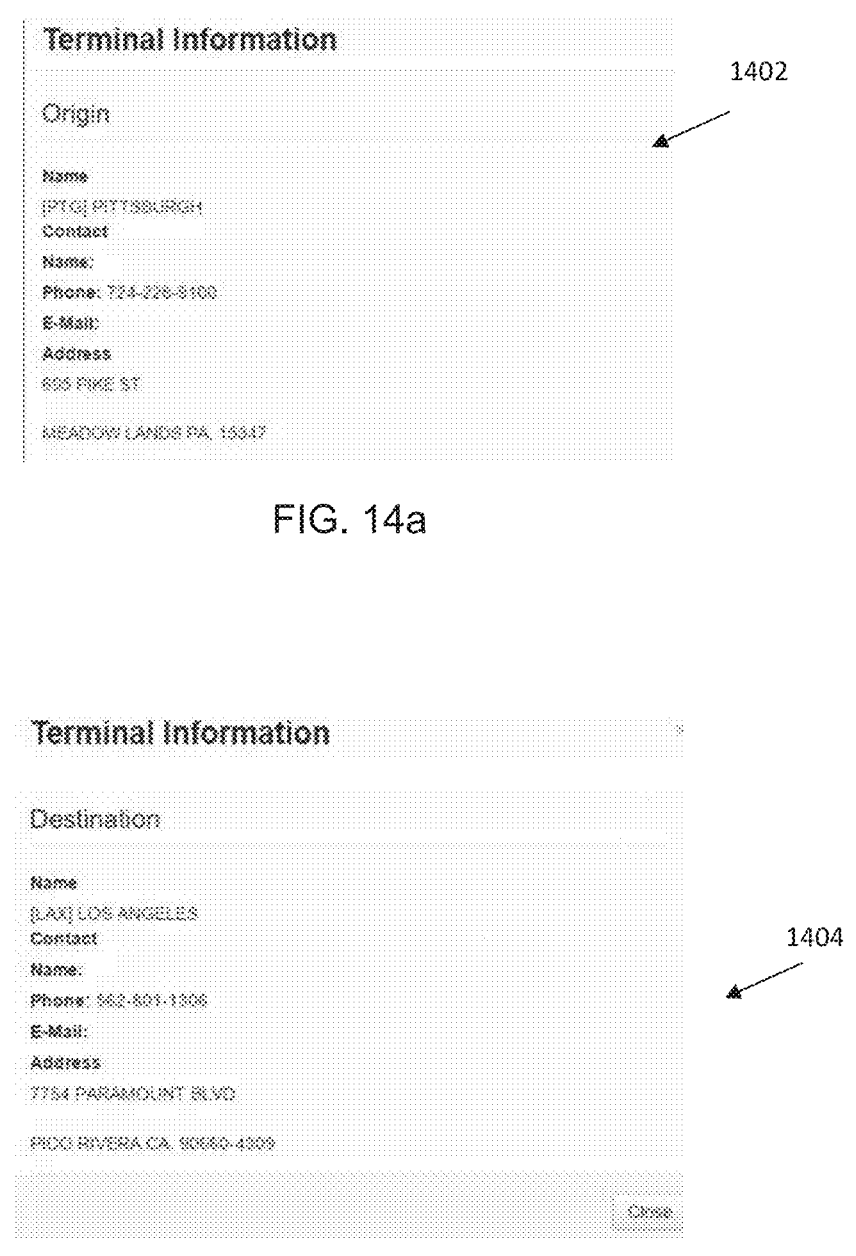

FIGS. 14a and 14b presents the screen that displays when a user activates one associated button of the group of "Terminals" buttons 1214. At the origin terminal information 1402 portion of the screen, the user may view information about the origin terminals of the associated carrier. At the destination terminal information 1404 portion of the screen, the user may view information about the destination terminals of the associated carrier. In embodiments, the information comprises a name, phone number, email address, and postal address for the origin and destination terminals respectively.

Figure 15:
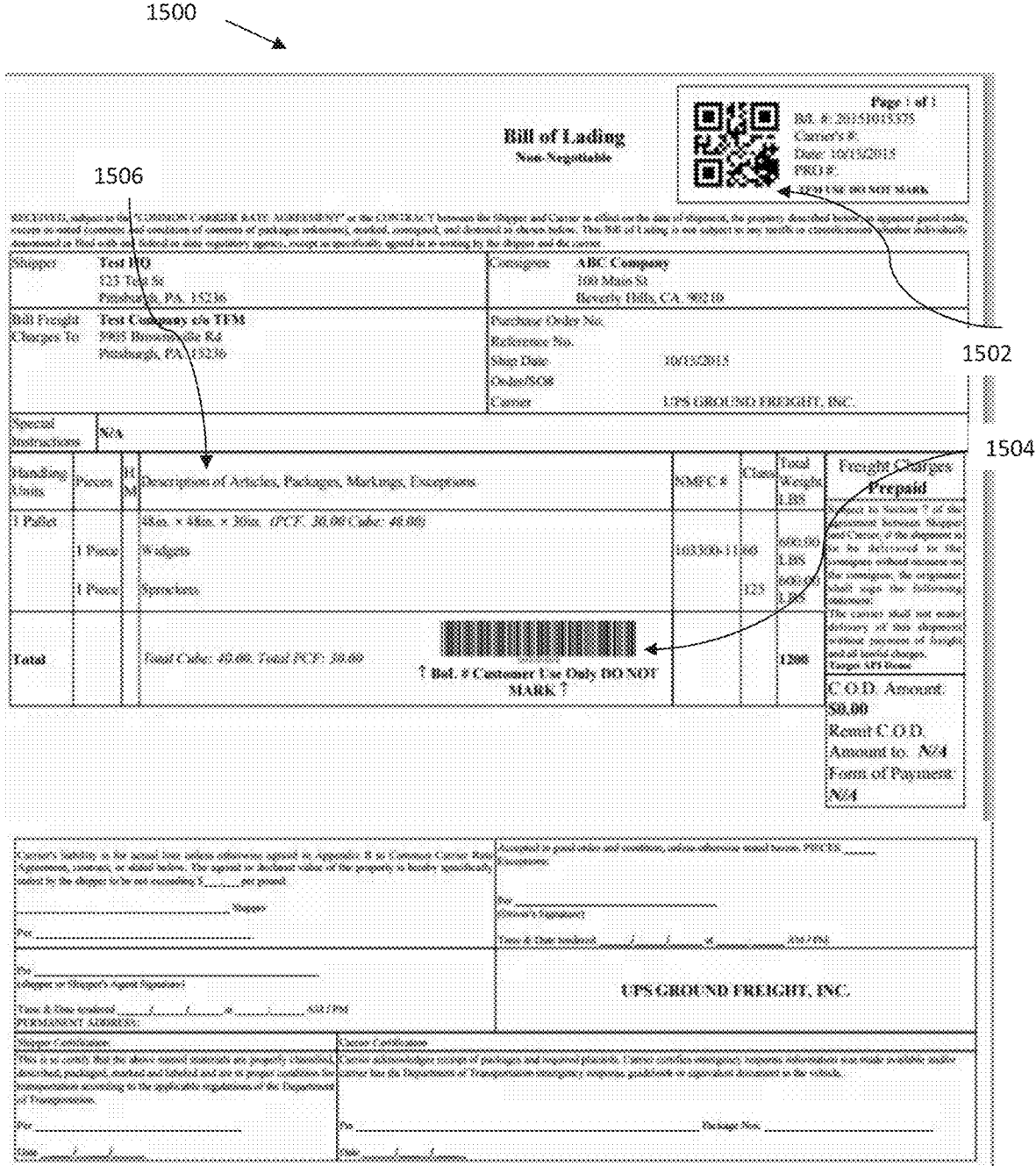

FIG. 15 depicts a screenshot 1500 of the executed electronic BOL file. The electronic BOL includes the information input by the user through aspects of the screen 600 described above. The Quick Response (QR) Code 1502 is a matrix barcode that represents information identifying the executed BOL. The information may comprise the dimensions of the freight units shipped with the BOL, the weight of the freight units, and the origination location and destination location for shipping the freight units. According to embodiments, the QR code may contain more information than a 1-dimensional barcode. In one embodiment, the QR code stores an identifier that is used to scan and load the data from the BOL when the BOL is scanned. The amount of data that can be stored with the QR code may be finite, and it saves horizontal space. The QR code may also support error correction; thus should the QR code become obscured by ink or torn and the data can still be read from it, the QR code allows for data retrieval unless it is completely ruined beyond what is supported in the level of error correction used to generate the QR code.

In embodiments, the user may use the QR code 1502 with a QR code reader or QR code scanner to transfer data identifying the BOL. The identifying data may comprise the BOL identification number, carrier number, PRO number and date of executing the BOL. The barcode 1504 functions similarly. A barcode reader can also transfer data identifying the BOL. The data may comprise the dimensions of the freight units shipped with the BOL, the weight of the freight units, and the origination location and destination location for shipping the freight units. Freight unit information 1506 comprises the dimensions of the freight unit as determined by the measuring system, the weights and densities of the products that comprise freight unit(s) and the freight unit as a whole, an origination location and a destination location for shipping the freight unit. In one embodiment, the freight unit constituent products are the products added to the handling unit by activating the "Add Product" button 936, described with reference to FIG. 9. In embodiments, the dimensions may be measured in linear feet or inches, the weight may be measured in pounds, and the density may be measured in PCF. In other embodiments, different measuring systems may be used for the described freight unit information such as kilograms, newtons, meters, yards, and kilograms per cubic meter.

Figure 16:
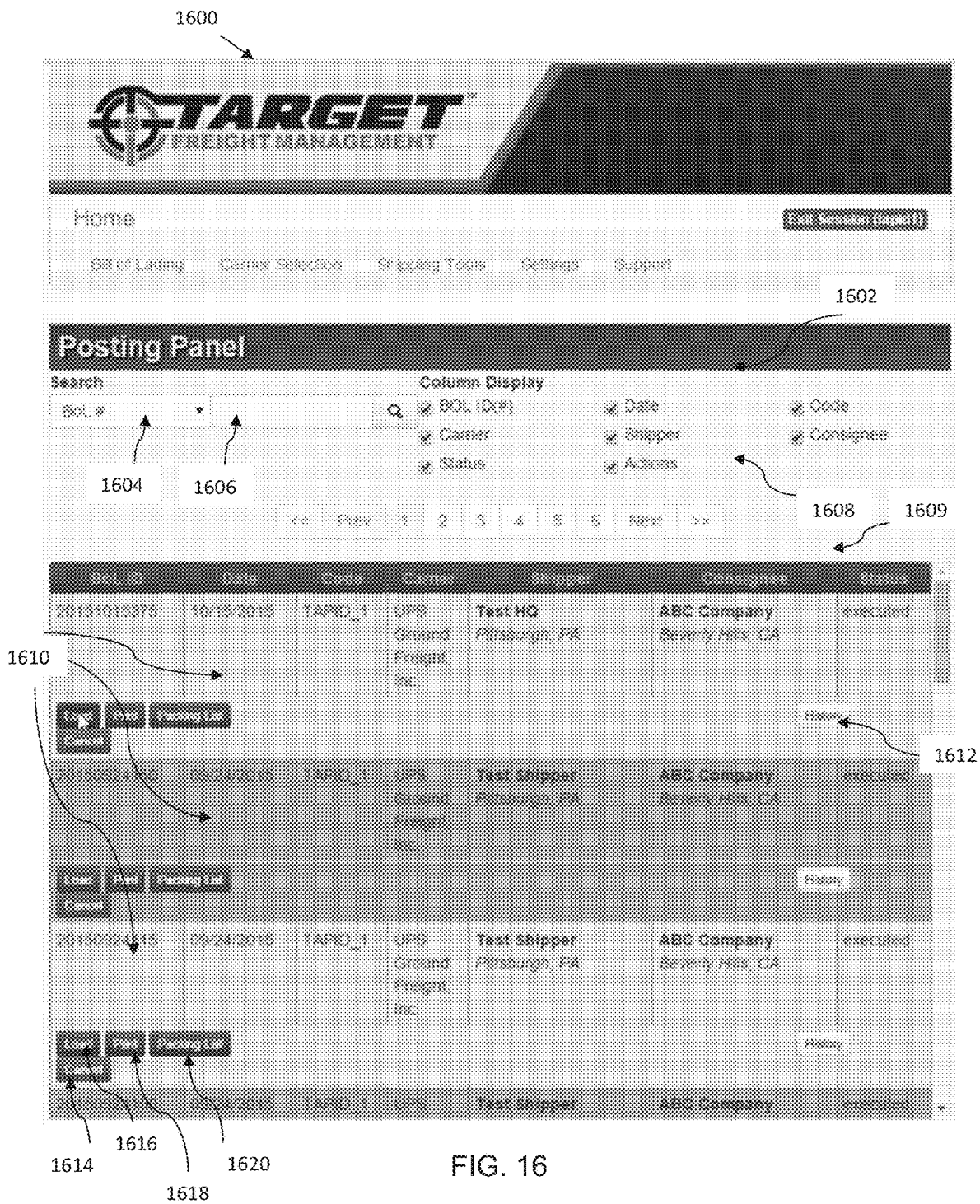

FIG. 16 displays the posting panel screen 1600 that results when a user activates the Posting Panel hyperlink 514. Under the Posting Panel banner 1602, the user may search for executed BOLs with the drop down menu 1604 and the input field 1606. With the menu 1604, the user selects the type of identification information used as criteria to search for executed BOLs. In embodiments, the user may select one of a group consisting of BOL identification number, carrier, status, date, shipper, actions, code and consignee. In one embodiment, the search criteria may be the same as the items in the Column Display field 1608. After selecting the criteria, the user enters information at the field 1606 to identify a particular executed BOL based on the selected criteria. The user may click on the Column Display radio buttons 1608 to select the column headers to display on the listing under the Posting Panel banner 1602. The radio buttons correspond to a group consisting of BOL identification number, carrier, status, date, shipper, actions, code and consignee. Clicking one of the radio buttons 1608 causes the addition of a column in the listing, with the constituent member of the group corresponding to the radio button labeled as the column header. The tabular structure includes rows comprising the executed BOLs that meet the search input and criteria selected by the user. In any particular row of the structure, the user may activate the "Load" button 1616, causing the BOL Entry screen 600 to load.

At the Posting Panel banner 1602 shown in FIG. 16, the listing 1609 comprises the columns corresponding to the radio buttons 1608 and rows 1610 that each represent individual executed BOLs matching the selected search input and criteria. For example, the first row 1610 of listing 1609 includes an executed BOL with BOL identification number 20151015375 and has columns for date, code, carrier, shipper, consignee, and status associated with that BOL. At each row 1610 of the listing, the user may activate the "Print" button 1618 to print a PDF copy of the corresponding BOL. The user may also activate the "Packing List" button 1620 to view the constituent products of the BOL. The user can also activate the "Cancel" button 1620 to cancel a particular shipment associated with a BOL. In one embodiment, activating the cancel button 1620 removes the BOL from reporting. In another embodiment, activating the cancel button 1620 may cancel a pickup request that is made to a carrier. History associated with a BOL appears when the user activates the "History" button 1612. In embodiments, the history may comprise a history of the status, which may include the actions performed on the BOL along with the party responsible for each action, corresponding to a particular BOL.

Figure 17:
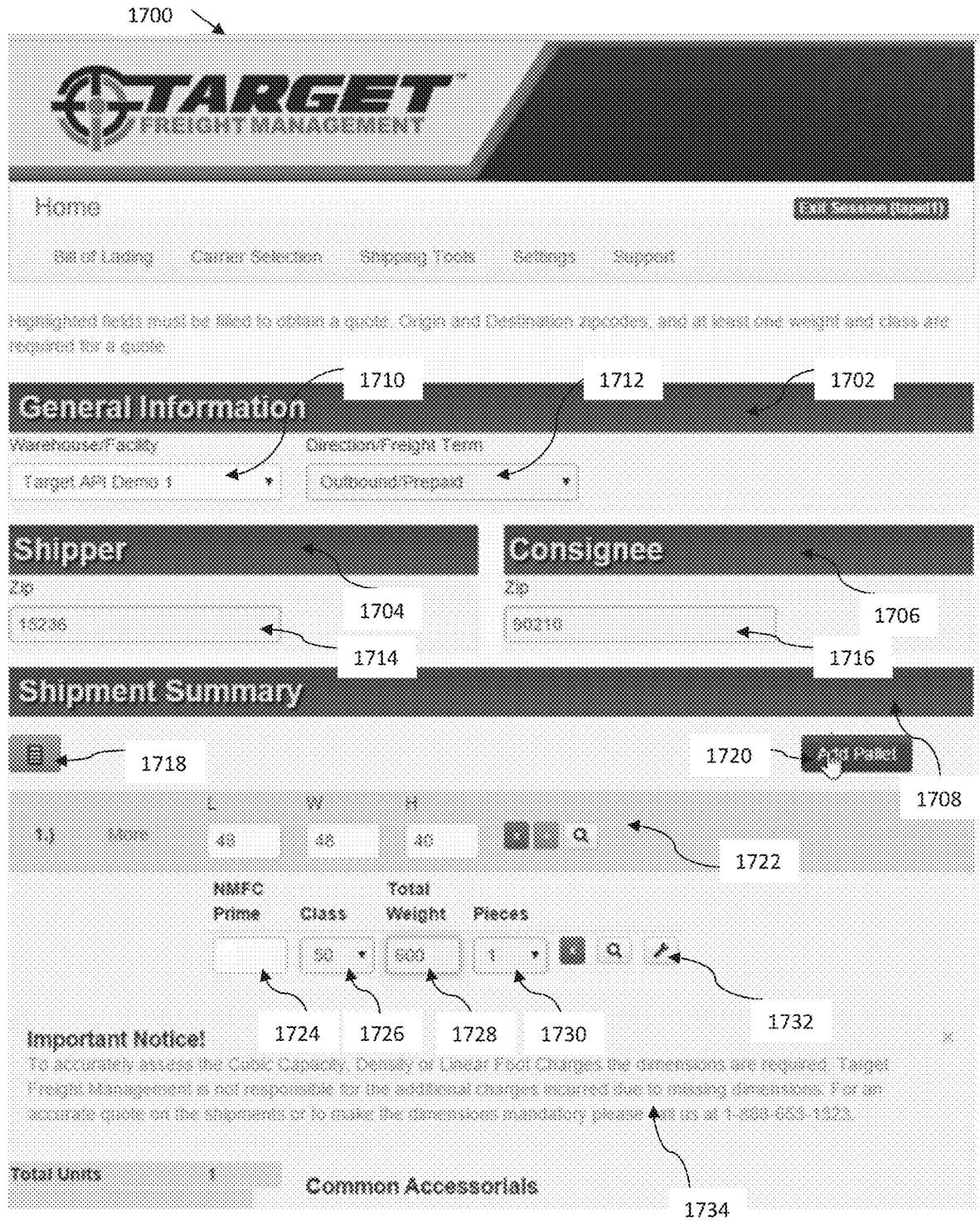

FIG. 17 shows the Least Cost Carrier (LCC) home screen 1700 that displays when the user activates the hyperlink for LCC Calculator 520 under the Carrier Selection banner on the home screen 500. The user may use this screen to obtain a quote for sending a shipment from an origin to a destination zip code. The LCC home screen includes the General Information banner 1702, Shipper banner 1704, Consignee banner 1706 and Shipment Summary banner 1708. Under the General Information banner 1702, the user may activate the dropdown menu for Warehouse/Facility menu 1710 to select the appropriate warehouse. In embodiments, the appropriate warehouse is the originating warehouse or facility for the shipment being quoted. At the Direction/Freight Term menu 1712, the user may select from options including Outbound/Prepaid, Outbound/Collect, Inbound/Collect, and Third Party. Under the Shipper banner 1704, the user inputs the origin zip code at the zip input field 1714. Under the banner 1706, the user inputs the destination zip code at the zip input field 1716. The user may activate the "Add Pallet" button 1720 to display a row 1722 that includes information about a pallet or other freight unit. At the row 1722, a user inputs the dimensions of the freight unit. In various embodiments, the dimensions include length, width and height. The user also inputs data at the NMFC Prime and Total Weight input fields 1724, 1728. At the Class menu 1726 and Pieces menu 1730, the user selects the appropriate menu entry. The NMFC Prime input field 1724 contains the appropriate NMFC classification for the freight unit. Class refers to a classification scheme based on density. In one embodiment, if the product of the row 1722 is a density-based product and the user inputs data at the field 1724, inputs a total weight at the field 1728, and activates the icon 1732, the Class input field 1726 will automatically populate. In various embodiments, the user can input data at the input fields 1724, 1728 and select a menu entry at the menus 1726, 1730 without activating the icon 1732. In other embodiments, the user may only input data at highlighted fields or menus 1726-1730 without inputting data at the field 1724 or pallet line 1722. When selected, calculator icon 1718 may convert the units input in certain fields, for example, the input fields of the pallet line 1722. In one embodiment, the units may be converted from feet to inches. In addition, the notice at the notice window 1734 may provide a warning to a user that an accurate quote based on an accurate determination of cubic capacity, density or linear foot requires the user to input the dimensions at row 1722. After inputting this data, the user may input data according to features of the LCC home screen 1700 that mirror aspects of the BOL Entry screen 600 described above. For example, the user fills out accessorials, which comprises aspects that are the same or similar to Common Accessorials group 1102. The user may also select carriers at an aspect similar to the listing 1205 and view a summary of carrier charges at an aspect similar to the data breakdown 1240. The user may also view terminal information at aspects similar to origin terminal information 1402 and destination terminal information 1404. After inputting the information described in FIG. 17, a user may obtain a quote. In embodiments, the quote is identified by a quote identification. The quote identification may comprise a sequence of characters and digits such as "QID-220039".

Figure 18:
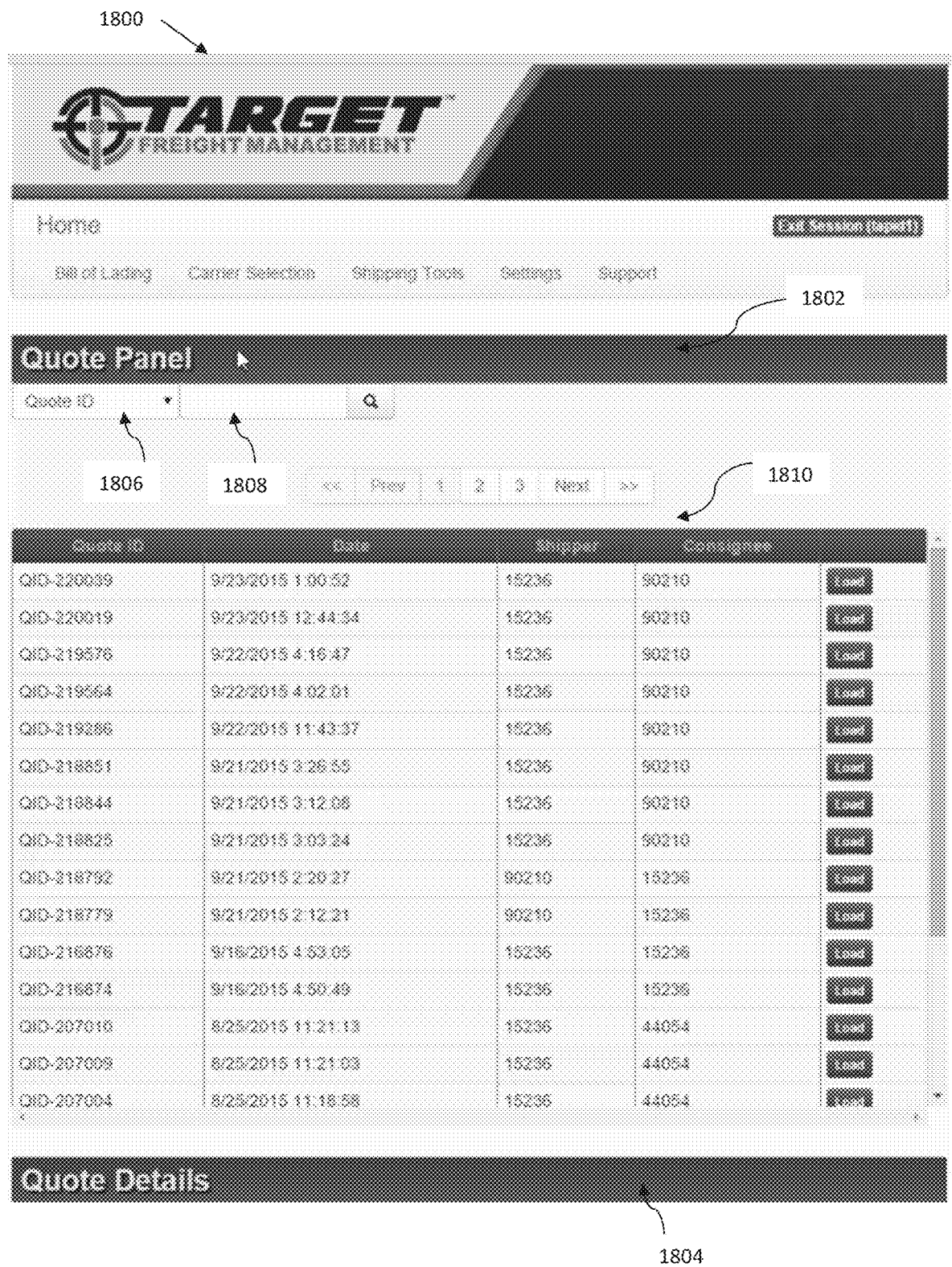
Figure 19:
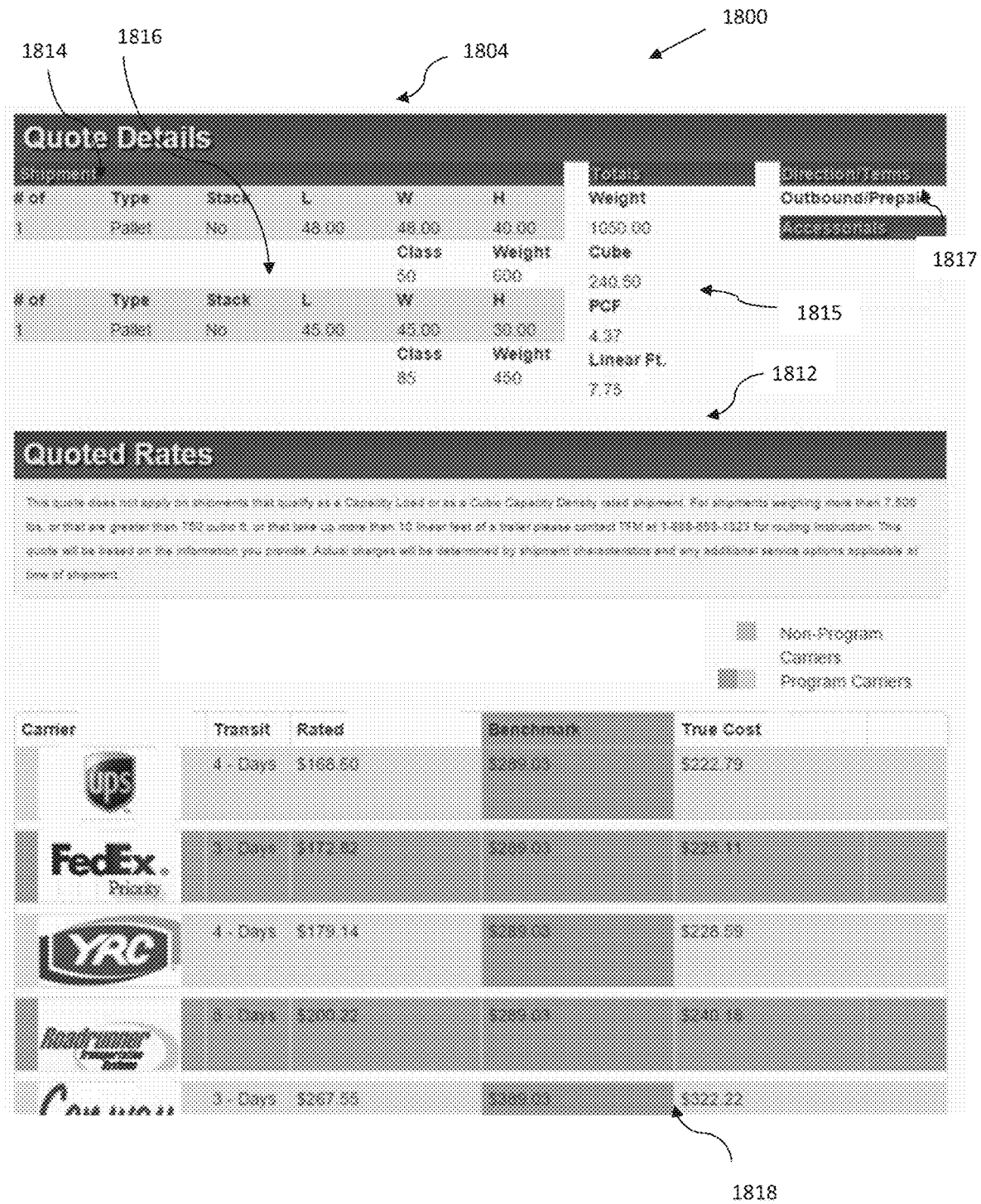

FIGS. 18 and 19 show that the Quote Panel screen 1800 that results when the user activates the hyperlink of Quote Panel 518. The Quote Panel screen 1800 includes banners for Quote Panel 1802, Quote Details 1804, and Quoted Rates 1812. Under the Quote Panel banner 1802, the user may search for executed quotes with the drop down menu 1806 and input field 1808. In menu 1806, a user may select a search criteria from a group of menu entries such as, for example, Quote ID, date, origination location, and/or destination location. After selecting the search criteria, the user enters information at 1808 to identify a particular executed quote based on the selected criteria. The listing 1810 comprises rows and columns based on the executed quotes matching the criteria and information at field 1808. In embodiments, the listing 1810 comprises five columns including Quote ID, Date, Shipper, Consignee, and Load columns. Each row consists of a unique quote identification in the first column and information corresponding to the column headers of the second to fifth columns. For example, the row with "QID-220039" also includes data in the other columns such as "9/23/2015 1:00:52" for Date, "15236" for Shipper, and "90210" for Consignee. The Load column comprises a "Load" button for each row of the listing 1810. If the user activates the "Load" button for a particular row, information about the quote identification associated with that row appears under the Quote Details 1804 and Quoted Rates 1812.

Further, FIG. 19 shows the banners of Quote Details 1804 and Quoted rates 1812. Under the banner 1804, the user may view information about the shipment, such as its constituent units of measure type. For example, in embodiments, a shipment may comprise a unit of measure type such as pallet. At the rows 1814 and 1816, the user may view information about the unit of measure type associated with the row. The information that the user may view includes the unit of measure type, number of that unit, whether the unit may be stacked, dimensions of the unit, class and weight. The dimensions may include length, width and height. In various embodiments, the information may be summarized under the Totals banner in the fields 1815, where the total weight, the cubic dimensions, the density measured in pounds per cubic feet, and the length measured in linear feet of the shipment are displayed. Under the group of banners 1817, the banner of "Direction/Terms" and "Accessorials" may indicate the selected direction/freight terms and any selected accessorials. Direction/freight terms include Outbound/Prepaid, Outbound/Collect, Inbound/Collect, and Third Party. Under the Quoted Rates 1812, the listing 1818 possesses a similar format to the listing 1205, described above. As shown in FIG. 19, the listing 1818 includes five columns. The five columns are labeled Carrier, Transit, Rated, Benchmark and True Cost. The columns display the same or similar information for a quote that columns 1204-1212 displayed in screen 600 with regard to FIGS. 12 and 13.

In one general aspect, therefore, the present invention is directed to systems and methods for managing a shipment comprising one or more freight units. The freight units may comprise both a container, such as a pallet or other container type, and the product(s) stacked on or otherwise loaded onto the container. In various embodiments, the system comprises a measuring system 2012 and a host computer system 2002 (e.g., see FIG. 1). The measuring system is for measuring dimensions and weight for each of the one or more freight units, with each of the freight units comprising one or more products. The host computer system comprises a web server 2004 and a database 2010 for storing, for each of a plurality of shipping carriers, carrier-specific shipping rules that specify rules for shipping freight for each carrier. The host computer system is programmed to receive information about the one or more freight units to be shipped, where the information comprises at least (i) the dimensions for each of the freight units as determined by the measuring system (e.g., length, width and/or height); (ii) the weight for each of the freight units as determined by the measuring system; and (iii) an origination location and a destination location for the shipment. The information is received from a user via a first web page on a web site provided by the web server. The host computer system is also programmed to determine, based on the received information and information about product types for the products of the shipment, whether the one or more products of the freight unit should be classified as density-based for a shipping rate determination. Upon a determination that the one or more products of the freight unit is classified as density-based, the host computer system determines: a density-based class of the one or more products of the freight unit; a linear feet parameter for the shipment based on positional configurations of the one or more freight units; and whether the linear feet parameter for the shipment exceeds a predetermined threshold value. In addition, based on the carrier-specific shipping rules stored in the database, the host computer system: determines: one or more carriers that will ship the shipment based on the density-based class and/or the linear feet parameter; and a shipping rate for the shipment for each of the one or more carriers that will ship the freight unit.

As mentioned above, in various implementations the shipment being shipped is for a shipper that is associated with a preselected list of carriers, under which circumstances, the step of determining the one or more carriers can comprise determining the one or more carriers from the preselected list of carriers for the shipper. Accordingly, a shipper may have a preselected list of carriers that it has used in the past or that offers a particular shipping rate for its goods, as the goods of that shipper may have special shipping requirements. For example, the shipper may have products that are of a length that exceeds the standard length of a box truck or cargo container and the shipper and carrier have a pre-negotiated rate that is beneficial to the shipper. Further, the carrier may have special vehicles that are designed to accommodate non-standard size products for shipping. Also, in various embodiments, the step of determining the one or more carriers comprises determining, for at least one of the one or more carriers, a predetermined threshold value of a shipping dimension for a freight unit and determining whether at least one of the one or more freight units of the shipment exceeds the predetermined threshold value of the shipping dimension.

The host computer system is further programmed to: update the first web page such that when the first web page is reloaded it displays a ranking of the one or more carriers; receive a selection input for a selected carrier from the one or more carriers displayed on the first web site; and upon receipt of the selection input for the selected carrier, creating an electronic bill of lading file.

In various implementations, the host computer system is further programmed to determine whether each of the one or more freight units satisfies a surface area container rule. In such an embodiment, the freight unit comprises a container that has a total surface area defined by the length and the width dimensions for the container. The host computer determines whether each of the one or more freight units satisfies the surface area container rule by: (i) determining a ratio of a surface area of the container covered by the one or more products compared to the total surface area of the container; and (ii) determining whether the ratio exceeds an applicable surface area threshold value. In such embodiments that utilize the surface area container rule, the host computer is programmed to determine the shipping rate by, for each freight unit that is below the applicable surface area threshold value, using a density based classification for the freight unit, where the density of the freight unit is determined based on at least the dimensions of the container (as opposed to the dimensions of the packages thereon).

In various implementations, displaying the ranking of the one or more carriers by shipping rate comprises modifying the first web page to display the ranking of the one or more carriers. Also, the ranking of the one or more carriers can be based on the shipping rate for the freight unit, such as in ascending order. Also, the information can comprise an indication of whether the freight unit is stackable. To that end, when the information comprises an indication the freight unit is not stackable, the host computer system can determine a default shipping height for the freight unit, which can be a maximum allowed height value. Also, the electronic bill of lading file can comprises a barcode that encodes data regarding the information about the freight unit. The host computer system can electronically transmit the electronic bill of lading to the selected carrier.

Also, in various implementations, upon receiving an input provided by the user, the host computer system can be programmed to display a second web site comprising a plurality of shipping terminals for the selected carrier from the one or more carriers displayed on the first web site. In addition, upon determining that the linear feet parameter for the freight unit exceeds the predetermined threshold value, the host computer system can display a second web site that comprises a notice associated with one of the one or more carriers that indicates the linear feet parameter of the freight unit that the freight unit exceeds the predetermined threshold value.

In general, it will be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as .NET, SQL, MySQL, HTML, C, C++, Python, and using conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include Bourne script, JavaScript, Python, Ruby, PHP, and Perl. Various embodiments may be employed in a Lotus Notes environment, for example. Such software may be stored on any type of suitable computer-readable medium or media such as, for example, a magnetic or optical storage medium. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Additionally, it is to be appreciated that the embodiments described herein illustrate example implementations, and that the functional elements, logical blocks, modules, and circuits elements may be implemented in various other ways which are consistent with the described embodiments. Furthermore, the operations performed by such functional elements, logical blocks, modules, and circuits elements may be combined and/or separated for a given implementation and may be performed by a greater number or fewer number of components or modules. As will be apparent to those of skill in the art upon reading the present invention, each of the individual embodiments described and illustrated herein has discrete components and features which may be readily separated from or combined with the features of any of the other several aspects without departing from the scope of the present invention. Any recited method can be carried out in the order of events recited or in any other order which is logically possible.

Reference to "one embodiment" or "an embodiment" means that a particular feature, structure, or characteristic described in connection with the embodiment is comprised in at least one embodiment. The appearances of the phrase "in one embodiment" or "in one aspect" in the specification are not necessarily all referring to the same embodiment.

Unless specifically stated otherwise, it may be appreciated that terms such as "processing," "computing," "calculating," "determining," or the like, refer to the action and/or processes of a computer or computing system, or similar electronic computing device, such as a general purpose processor, a DSP, ASIC, FPGA or other programmable logic device, discrete gate or transistor logic, discrete hardware components, or any combination thereof designed to perform the functions described herein that manipulates and/or transforms data represented as physical quantities (e.g., electronic) within registers and/or memories into other data similarly represented as physical quantities within the memories, registers or other such information storage, transmission or display devices.

The flow charts and methods described herein show the functionality and operation of various implementations. If embodied in software, each block, step, or action may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

It will be appreciated that those skilled in the art will be able to devise various arrangements which, although not explicitly described or shown herein, embody the principles of the present invention and are comprised within the scope thereof. Furthermore, all examples and conditional language recited herein are principally intended to aid the reader in understanding the principles described in the present invention and the concepts contributed to furthering the art, and are to be construed as being without limitation to such specifically recited examples and conditions. Moreover, all statements herein reciting principles, aspects, and embodiments as well as specific examples thereof, are intended to encompass both structural and functional equivalents thereof. Additionally, it is intended that such equivalents comprise both currently known equivalents and equivalents developed in the future, i.e., any elements developed that perform the same function, regardless of structure. The scope of the present invention, therefore, is not intended to be limited to the exemplary aspects and aspects shown and described herein.

What is claimed is:

1. A system for managing a freight shipment comprising one or more freight units, wherein each of the one or more freight units comprises one or more products, the system comprising:
    a host computer system that comprises a web server and a database for storing, for each of a plurality of shipping carriers, carrier-specific shipping rules that specify rules for shipping freight for each carrier, wherein the host computer system performs steps comprising:
        receiving electronically information about the freight shipment wherein the received information comprises:
            the dimensions for each of the freight units;
            the weight for each of the freight units; and
            an origination location and a destination location for the shipment;
        determining, based on the received information and information about product types for the products of the freight shipment, whether each of the one or more products of the freight units should be designated as density-based for a shipping rate determination, wherein density-based means that the shipping rate calculated for a product depends on the density of that product;
        for each of the one or more products that is designated as density-based ("the one or more density-based products"), determining a density-based class of the one or more density-based products;
        determining a linear feet parameter for the shipment based on positional configurations of the one or more freight units, wherein the linear feet parameter for the shipment is the largest value of length, width, and height for the shipment;
        determining whether the linear feet parameter for the shipment exceeds a predetermined threshold value;
        based on the carrier-specific shipping rules stored in the database:
            determining one or more carriers that will ship the shipment based on the density-based class for the one or more density-based products and/or the linear feet parameter, wherein the host computer system determines the one or more carriers that will ship the shipment by performing steps that comprise, at runtime:
                generating a binary meta programming logic string for each of the one or more carriers, wherein the binary meta programming logic strings for each of the one or more carriers are based on evaluations of conditions corresponding to the carrier's shipping rules; and
                executing the binary meta programming logic string for each of the one or more carriers, wherein a valid result indicates that the carrier will ship the shipment; and
            receiving an electronic selection input for a selected carrier from the one or more carriers; and
            upon receipt of the selection input for the selected carrier, creating an electronic bill of lading file for the freight shipment.

2. The system of claim 1, further comprising a measurement system for measuring the dimensions and weight of the one or more freight units.

3. The system of claim 2, wherein the dimensions of the one or more freight units comprise a length of each freight unit and a width of each freight unit.

4. The system of claim 3, wherein the dimensions of the one or more freight units further comprise a height of each freight unit.

5. The system of claim 4, wherein the information about the one or more freight units to be shipped comprises an indication of whether each freight unit is stackable.

6. The system of claim 5, wherein, when the information about the one or more freight units to be shipped comprises an indication each freight unit is not stackable, the host computer system assigns a default height for each freight unit based on the carrier-specific shipping rules stored in the database.

7. The system of claim 1, wherein:
    the shipment being shipped is for a shipper;
    the shipper is associated with a preselected list of carriers; and
    the step of determining the one or more carriers comprises determining the one or more carriers from the preselected list of carriers for the shipper.

8. The system of claim 1, wherein the step of determining the one or more carriers that will ship the shipment comprises determining, for at least one of the one or more carriers, a predetermined threshold value of a shipping dimension for a freight unit and determining whether at least one of the one or more freight units of the shipment exceeds the predetermined threshold value of the shipping dimension.

9. The system of claim 1, wherein the host computer system is further programmed to determine whether each of the one or more freight units satisfies a surface area container rule, wherein:
the freight unit comprises a container that has a total surface area defined by the length and the width dimensions for the container; and
the host computer system determines whether each of the one or more freight units satisfies the surface area container rule by:
determining a ratio of a surface area of the container covered by the one or more products compared to the total surface area of the container; and
determining whether the ratio exceeds an applicable surface area threshold value.

10. The system of claim 1, wherein the host computer system is further programmed to generate a web page that displays a ranking of the one or more carriers that will ship the shipment.

11. The system of claim 10, wherein the one or more carriers are ranked by shipping rate for the freight shipment in ascending order.

12. The system of claim 1, wherein the host computer system electronically transmits the electronic bill of lading file to the selected carrier.

13. The system of claim 1, wherein, for a carrier where execution of the binary meta programming logic string results in an invalid result, the host computer system displays a notice associated with the carrier that a characteristic of the shipment exceeds a threshold value for the carrier.

14. A method for determining carriers that will ship a freight shipment, wherein the freight shipment comprises one or more freight units and wherein each of the one or more freight units comprises one or more products, the method comprising:
storing, in a computer database, for each of a plurality of shipping carriers, carrier-specific shipping rules that specify rules for shipping freight for each carrier;
receiving, by a host computer system that is in communication with the computer database, information about the freight shipment, wherein the information comprises:
the dimensions for each of the freight units;
the weight for each of the freight units; and
an origination location and a destination location for the shipment;
determining, by the host computer system:
whether each of the one or more products of the freight units should be designated as density-based for a shipping rate determination;
a linear feet parameter for the shipment based on positional configurations of the one or more freight units; and
based on the carrier-specific shipping rules stored in the database, one or more carriers that will ship the shipment based on the density-based class for the one or more density-based products and/or the linear feet parameter, wherein the host computer system determines the one or more carriers that will ship the shipment by performing steps that comprise, at run-time:
generating a binary meta programming logic string for each of the one or more carriers, wherein the binary meta programming logic strings for each of the one or more carriers are based on evaluations of conditions corresponding to the carrier's shipping rules; and
executing the binary meta programming logic string for each of the one or more carriers, wherein a valid result indicates that the carrier will ship the shipment; and
receiving, by the host computer system, a selection input for a selected carrier from the one or more carriers; and
upon receipt of the selection input for the selected carrier, creating an electronic bill of lading file for the freight shipment.

15. The method of claim 14, wherein:
the shipment being shipped is for a shipper;
the shipper is associated with a preselected list of carriers; and
the step of determining the one or more carriers comprises determining the one or more carriers from the preselected list of carriers for the shipper.

16. The method of claim 14, wherein the step of determining the one or more carriers that will ship the shipment comprises determining, by the host computer system, for at least one of the one or more carriers, a predetermined threshold value of a shipping dimension for a freight unit and determining whether at least one of the one or more freight units of the shipment exceeds a predetermined threshold value of the shipping dimension.

17. The method of claim 14, further comprising determining, by the host computer system, whether each of the one or more freight units satisfies a surface area container rule, wherein:
the freight unit comprises a container that has a total surface area defined by the length and the width dimensions for the container; and
the host computer system determines whether each of the one or more freight units satisfies the surface area container rule by:
determining a ratio of a surface area of the container covered by the one or more products compared to the total surface area of the container; and
determining whether the ratio exceeds an applicable surface area threshold value.

18. The method of claim 14, further comprising generating, by the host computer system, a web page that displays a ranking of the one or more carriers that will ship the shipment by shipping rate for the freight shipment in ascending order.

19. The method of claim 14, wherein:
the received information about the one or more freight units to be shipped comprises an indication of whether each freight unit is stackable; and
when the information about the one or more freight units to be shipped comprises an indication each freight unit is not stackable, further comprising, assigning by the host computer system a default height for each freight unit based on the carrier-specific shipping rules stored in the database.

20. The method of claim 14, further comprising electronically transmits the electronic bill of lading file to the selected carrier by the host computer system.

21. The method of claim 14, wherein, for a carrier where execution of the binary meta programming logic string results in an invalid result, further comprising displaying, by the host computer system, a notice associated with the carrier that a characteristic of the shipment exceeds a threshold value for the carrier.

* * * * *